US009359509B2

(12) United States Patent
Kobayashi et al.

(10) Patent No.: US 9,359,509 B2
(45) Date of Patent: Jun. 7, 2016

(54) AQUEOUS CARBON FILLER DISPERSION COATING LIQUID, CONDUCTIVITY-IMPARTING MATERIAL, ELECTRODE PLATE FOR AN ELECTRICAL STORAGE DEVICE, MANUFACTURING METHOD THEREFORE, AND ELECTRICAL STORAGE DEVICE

(75) Inventors: Nobuyuki Kobayashi, Tokyo (JP); Takanori Sannan, Tokyo (JP); Shinya Tsuchida, Tokyo (JP); Yoshihiko Iijima, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 615 days.

(21) Appl. No.: 13/392,048

(22) PCT Filed: Aug. 24, 2010

(86) PCT No.: PCT/JP2010/064263
§ 371 (c)(1),
(2), (4) Date: Feb. 23, 2012

(87) PCT Pub. No.: WO2011/024798
PCT Pub. Date: Mar. 3, 2011

(65) Prior Publication Data
US 2012/0156563 A1 Jun. 21, 2012

(30) Foreign Application Priority Data

Aug. 27, 2009 (JP) ................................ 2009-197036

(51) Int. Cl.
*H01M 4/02* (2006.01)
*C09D 5/24* (2006.01)
*H01G 11/38* (2013.01)
*H01M 4/04* (2006.01)
*H01M 4/13* (2010.01)
*H01M 4/139* (2010.01)
*H01M 4/62* (2006.01)
*H01M 4/66* (2006.01)
*C09D 101/28* (2006.01)
*C09D 103/08* (2006.01)
(Continued)

(52) U.S. Cl.
CPC . *C09D 5/24* (2013.01); *C08L 1/284* (2013.01); *C08L 1/286* (2013.01); *C08L 3/08* (2013.01); *C08L 5/04* (2013.01); *C08L 5/08* (2013.01); *C09D 101/284* (2013.01); *C09D 101/286* (2013.01); *C09D 103/08* (2013.01); *C09D 105/04* (2013.01); *C09D 105/08* (2013.01); *H01G 11/26* (2013.01); *H01G 11/28* (2013.01); *H01G 11/38* (2013.01); *H01M 4/0404* (2013.01); *H01M 4/13* (2013.01); *H01M 4/139* (2013.01); *H01M 4/622* (2013.01); *H01M 4/667* (2013.01); *H01M 4/583* (2013.01); *H01M 4/625* (2013.01); *H01M 10/0525* (2013.01); *Y02E 60/122* (2013.01); *Y02E 60/13* (2013.01); *Y02P 70/54* (2015.11); *Y10T 428/2913* (2015.01); *Y10T 428/31678* (2015.04); *Y10T 428/31971* (2015.04); *Y10T 428/31975* (2015.04); *Y10T 442/20* (2015.04)

(58) Field of Classification Search
CPC ...... C09D 5/24; C09D 105/08; C09D 105/04; C09D 103/08; C09D 101/286; C09D 101/284; H01G 11/38; H01G 11/26; H01G 11/28; C08L 5/08; C08L 5/04; C08L 3/08; C08L 1/286; C08L 1/284; H01M 4/0404; H01M 4/13; H01M 4/139; H01M 4/622; H01M 4/667; H01M 4/583; H01M 4/625; H01M 10/05; C08K 3/0033; C08K 5/092
USPC .......... 429/211; 428/457, 426, 532, 446, 533, 428/364, 473; 442/59; 427/77
See application file for complete search history.

(56) References Cited

U.S. PATENT DOCUMENTS

| 5,521,292 | A | 5/1996 | Ueda et al. |
| 2002/0132167 | A1 | 9/2002 | Gan et al. |

(Continued)

FOREIGN PATENT DOCUMENTS

| CN | 101116201 | 1/2008 |
| CN | 101806766 | 8/2010 |

(Continued)

OTHER PUBLICATIONS

Abe et al.: "Charge Transfer Reactions in Li-Ion Batteries" Journal of The Surface Science Society of Japan, 27(10), 609-612 (2006); English Abstract.
Akatsuka, Yasumasa: "Development Trends of Environment-responsive Epoxy Resins", JETI, 50(9), 103-105 (2002); English Abstract.
Hashimoto et al.: "Electrolyte Thin Film Formation for Solid Oxide Fuel Cells Using Water-based Slurry Contained $Ce_{0.9}Gd_{0.1}O_{1.95}$ Nano-powder". ElectroChemistry. 77(2), 195-198 (2009); English Abstract.

(Continued)

*Primary Examiner* — Gary Harris
(74) *Attorney, Agent, or Firm* — Hamre, Schumann, Mueller & Larson, P.C.

(57) ABSTRACT

A water-based, carbon filler-dispersed coating formulation for forming a conductive coating film contains (1) a hydroxyalkyl chitosan as a resin binder, (2) a conductive carbon filler, and (3) a polybasic acid or its derivative in a water-based medium containing at least water as a polar solvent. In 100 parts by mass of the coating formulation, the hydroxyalkyl chitosan (1) is contained in a range of from 0.1 to 20 parts by mass, and the conductive carbon filler (2) is contained in a range of from 1 to 30 parts by mass. An electricity-imparting material, an electrode plate for an electricity storage device, a process for producing the electrode plate, and the electricity storage device are also disclosed.

8 Claims, No Drawings

(51) Int. Cl.

| | | |
|---|---|---|
| C09D 105/04 | (2006.01) | |
| C09D 105/08 | (2006.01) | |
| C08L 1/28 | (2006.01) | |
| C08L 3/08 | (2006.01) | |
| C08L 5/04 | (2006.01) | |
| C08L 5/08 | (2006.01) | |
| H01G 11/26 | (2013.01) | |
| H01G 11/28 | (2013.01) | |
| H01M 4/583 | (2010.01) | |
| H01M 10/0525 | (2010.01) | |

(56) References Cited

U.S. PATENT DOCUMENTS

| | | | |
|---|---|---|---|
| 2002/0160247 A1 | 10/2002 | Tzeng et al. | |
| 2003/0027046 A1 | 2/2003 | Hosokawa et al. | |
| 2004/0092620 A1 | 5/2004 | Kobayashi et al. | |
| 2004/0130038 A1 | 7/2004 | Murakami et al. | |
| 2005/0225929 A1 | 10/2005 | Murakami et al. | |
| 2006/0222952 A1 | 10/2006 | Kono | |
| 2007/0109722 A1* | 5/2007 | Ohmori | 361/502 |
| 2008/0160405 A1 | 7/2008 | Yang et al. | |
| 2009/0029255 A1 | 1/2009 | Ohmori | |
| 2009/0257171 A1* | 10/2009 | Yamazaki et al. | 361/502 |
| 2009/0284900 A1 | 11/2009 | Fukumine | |
| 2009/0317718 A1 | 12/2009 | Imachi et al. | |
| 2010/0291306 A1 | 11/2010 | Tsuchida et al. | |
| 2011/0043966 A1 | 2/2011 | Kobayashi | |
| 2011/0091771 A1 | 4/2011 | Sannan et al. | |
| 2011/0133763 A1 | 6/2011 | Schulte et al. | |
| 2011/0305970 A1 | 12/2011 | Sahai et al. | |
| 2012/0148917 A1 | 6/2012 | Kobayashi et al. | |
| 2012/0156562 A1 | 6/2012 | Kobayashi et al. | |
| 2012/0160128 A1 | 6/2012 | Kobayashi et al. | |

FOREIGN PATENT DOCUMENTS

| | | |
|---|---|---|
| EP | 1978056 | 10/2008 |
| EP | 2048726 | 4/2009 |
| EP | 2284235 | 2/2011 |
| JP | 63-10456 | 1/1988 |
| JP | 3-285262 | 12/1991 |
| JP | 5-194912 | 8/1993 |
| JP | 9-227633 | 9/1997 |
| JP | 11-297332 | 10/1999 |
| JP | 11-323175 | 11/1999 |
| JP | 2001-6436 | 1/2001 |
| JP | 2002-42817 | 2/2002 |
| JP | 2002-105241 | 4/2002 |
| JP | 2003-206409 | 7/2003 |
| JP | 2003-272619 | 9/2003 |
| JP | 2004-186221 | 7/2004 |
| JP | 2004-210980 | 7/2004 |
| JP | 2005-129437 | 5/2005 |
| JP | 2006-040595 | 2/2006 |
| JP | 2006-134777 | 5/2006 |
| JP | 2006-286344 | 10/2006 |
| JP | 2006-310010 | 11/2006 |
| JP | 2007-095641 | 4/2007 |
| JP | 2007-224263 | 9/2007 |
| JP | 2008-60060 | 3/2008 |
| JP | 2008-184485 | 8/2008 |
| JP | 2009-26744 | 2/2009 |
| JP | 2009-64564 | 3/2009 |
| JP | 2009-148681 | 7/2009 |
| JP | 2009-170287 | 7/2009 |
| JP | 2009-238720 | 10/2009 |
| JP | 2009-277783 | 11/2009 |
| JP | 2011-528794 | 11/2011 |
| TW | 200828658 | 7/2008 |
| TW | 200849699 | 12/2008 |
| TW | 200923032 | 6/2009 |
| WO | 2006/085691 | 8/2006 |
| WO | 2006/106680 | 10/2006 |
| WO | WO2007/086211 | 8/2007 |
| WO | WO2008/015828 | 2/2008 |
| WO | WO2008/123143 | 10/2008 |
| WO | WO 2009/147989 | 12/2009 |

OTHER PUBLICATIONS

Takada, Kazunori: "Improvement of high-rate capability of solid-state lithium-ion battery", Technical Research Report, The Institute of Electronics, Information and Communication Engineers, 107(493), 43-47 (2008); English Abstract.

Yoshitake et al.; SEI Films Obtained by the Addition of Functional Additives to Li-Ion Batteries, Journal of The Surface Finishing Society of Japan, 53(12), 887-889 (2002); English Abstract.

Fujiyama: "New Mixing and Dispersion Technology for Conductive Fillers and Measures for Mixing and Dispersion Failures"; Technical Information Institute Co., Ltd. p. 20 (2004); English Abstract.

Tachibana: "Preparation, Coating and Drying of Positive Electrode Slurry for Lithium Ion Secondary Cells, and Understanding of Electrode Operations" Technical Information Institute Co., Ltd., 8(12), pp. 72-75 (2009); English Abstract.

Joe: "Technological Development of Dispersing Agents for Water Borne Coating Materials" JETI, 44(10), pp. 110-112 (1996); English Abstract.

Kamiya: "Characterization and control of aggregation and dispersion behavior of fine powder in aqueous suspension" 2(1), pp. 54-60; English Abstract.

Form PTO-892, May 13, 2015; Office Action issued in co-pending U.S. Appl. No. 13/392,034.

\* cited by examiner

AQUEOUS CARBON FILLER DISPERSION COATING LIQUID, CONDUCTIVITY-IMPARTING MATERIAL, ELECTRODE PLATE FOR AN ELECTRICAL STORAGE DEVICE, MANUFACTURING METHOD THEREFORE, AND ELECTRICAL STORAGE DEVICE

TECHNICAL FIELD

This invention relates to a water-based, carbon filler-dispersed coating formulation, which contains a conductive carbon filler uniformly dispersed therein and enables the formation of a conductive coating film without adding much load on the environment, and also to its application technologies. More specifically, this invention relates to a technology which especially in an electricity storage device such as a secondary cell or capacitor, is effective for enhancing the adhesion between a collector and an electrode active material layer (hereinafter called "the electrode layer"), decreasing the internal resistance, and also improving the cycle characteristics by arranging a coating film of excellent solvent resistance between the collector and the electrode layer and which makes it possible to provide an electrode plate for an electricity storage device and the electricity storage device including the electrode plate.

BACKGROUND ART

In recent years, attempts have been made in various fields to use the functionality of coating films formed by preparing slurries, pastes or the like, which contain functional materials and will hereinafter be referred to as "slurries", into coating formulations and applying the coating formulations.

For example, a paste-form, conductive coating formulation composed of a conductive filler, binder resin, curing agent, solvent and the like is used as a conductive adhesive, conductive paint, conductive ink or the like depending on its application (Non-patent Document 1). A coated, magnetic recording medium such as an audio tape, video tape, floppy disk or the like is manufactured by applying, onto a base film of a polyester or the like, a magnetic coating formulation with magnetic particles of submicron size uniformly dispersed in a polymer solution. Further, each electrode structure of a lithium ion secondary cell is realized by mixing a binder with an active material and conductive aid to prepare a slurry, coating the slurry onto a collector foil, and then drying it (Non-patent Document 2).

As common attributes that allow each of the above-described various coating formulations to fully exhibit its functionality, the dispersoid is uniformly dispersed in the dispersion medium, and moreover, the coating film to be formed can realize high adhesiveness. In other words, for allowing a functional filler to fully exhibit its functionality by using a slurry with the functional filler contained therein, it is essential conditions that the state of the slurry is appropriate for the exhibition of the functionality of the filler, specifically that the filler is uniformly and stably dispersed and can form a coating film of high adhesiveness Choosing adequate solvents with a focus being centered around the dispersibility of a filler with a view to meeting such conditions, nonaqueous (organic-solvent-based) solvents (dispersion media), which are excellent in the uniform dispersibility of the filler, show high adhesive force and can be readily dried, are overwhelmingly advantageous as solvents (dispersion media), and as a matter of fact, have been widely used.

However, organic solvents are not only volatile and high in environmental load but are also required to take genotoxicity into consideration, and therefore, still involve problems in safety and workability. In recent years, there is an increasing concern about the protection of environment and the prevention of health hazards in many industrial fields, leading to increasing demands toward VOC reductions, solventless coating and the like in connection with the use of organic solvents involving such problems as described above. It is, accordingly, required to switch to products that are friendly to the environment and people.

Now, those which are attracting the greatest attention as products friendly to the environment and people are water-based products or products made from raw materials of biological origin, which are expected to become part of solventless or post-petroleum products. Various problems, however, arise if water is used as a solvent in place of an organic solvent in a slurry that contains a conductive carbon filler. In a water-based slurry, for example, filler particles tend to agglomerate in the slurry when they are in a charged state, and moreover, they are prone to settling due to a large difference in specific gravity between the solvent and the solute, thereby raising a problem in that their uniform dispersion is very difficult. In addition, it is not easy to find raw materials of biological origin, which exhibit film-forming ability and dispersing ability and can replace conventional raw materials of petroleum origin.

As general measures to cope with dispersion failures, addition of a dispersant, surface treatment, microencapsulation or ultrasonic treatment of a filler, introduction of polar groups into a polymer, and the like can be contemplated. In fact, examples of the addition of a dispersant include the attempt to use a water-soluble, amphoteric dispersant for a slurry composition that contains a microparticulated black inorganic oxide useful in paints, inks, rubbers and plastics, electronic materials and the like (Patent Document 1) and the attempt to use a compound having one or more basic functional groups in an composition for cells, which contains a conductive aid (Patent Document 2). Further, examples of the surface treatment of a filler include various proposals such as the attempt to form surface treatment layers by reacting the metal oxide on surfaces of a microparticulate metal-oxide filler with a hydrophilic silane coupling agent (Patent Document 3). In addition, proposals have been made including the application of ultrasonic vibrations to a paste, which contains an inorganic oxide filler, to disperse the filler and the formation of an insulating resin on surfaces of a conductive filler to provide microencapsulated conductive filler.

However, the dispersion media used in these proposals are primarily organic solvents, and water-based media are used only in a very small number of cases. In contrast to these proposals, it is strongly desired, from an increasing concern about the protection of environment and the prevention of health hazards in recent years, to develop a method that uses a water-based slurry, which is friendly to the environment, is low cost and is high in safety, and that can uniformly disperse a filler.

Upon attempting the dispersion and stabilization of a filler in a water-based slurry, the use of the above-described, respective methods may be contemplated. Among them, the use of a dispersant is advantageous when the simplification of the production process and coating system and the cost matter are taken into account. As a dispersant for use in a water-based slurry, it is possible to mention a polycarboxylate salt or phosphate amine salt used in the field of paints (Non-patent Document 3), a polyacrylamide as a high-molecular dispersant (Non-patent Document 4), or the like. When a reduction in environmental load is taken into consideration, however, preferred is a substance of natural origin rather than a petroleum-based substance. In this regard, a proposal has been made about the use of carboxymethylcellulose as a water-based dispersant upon production of each electrode for a nonaqueous secondary cell (Patent Document 4). According to a study by the present inventors, however, there is still a room for an improvement in its dispersing effect. On the other hand, the use of a petroleum-based binder resin is needed to form a strong coating film. There is, accordingly, an outstanding desire for a binder resin that despite of a substance of biological origin, can exhibit adhesiveness which is by no means inferior to that available from a petroleum-based binder resin.

As an expected application for the above-described water-based slurry composition, a coating formulation for electrode plates in electricity storage devices such as secondary cells or capacitors is considered. The demand for these electricity storage devices has been significantly growing in recent years. Each electrode plate gives considerable effects on the performance of an electricity storage device, and is an electrode member with unit members such as an electrode layer and collector integrated therein. Concerning such an electrode plate, proposals have been made to permit its production in the form of a thinner film with larger area such that it can be provided with an extended charge-discharge cycle life and an increased energy density. As to lithium ion cells, for example, Patent Document 5, Patent Document 6, etc. disclose positive electrode plates each of which is obtained by dispersing or dissolving a conductive material and binder along with powder of a positive-electrode active material such as a metal oxide, sulfide or halogenide in an appropriate solvent to prepare a paste-form coating formulation, providing as a substrate a collector formed of a foil of a metal such as aluminum, and applying the coating formulation onto a surface of the substrate to form a coating film layer.

A capacitor, which makes use of an electric double layer formed at an interface between a polarizable electrode plate and an electrolyte, is used as a memory backup power supply, and its use in fields that require large outputs like a power source for an electric car is also attracting interests. For large outputs, this capacitor is hence required to have both a high capacitance and a low internal resistance. Like a negative electrode plate for the above-described cell, the electrode plate for the capacitor is produced by applying onto a collector a coating formulation, which is generally formed of a binder, conductive material and the like mixed together, and then drying the coating formulation.

As a resin binder for use in the above-described coating formulation for the electrode plates in the above-described electricity storage device such as the lithium ion cell or capacitor, a fluorinated resin such as polyfluorinated vinylidene or a silicone-acrylic copolymer is used, for example. A negative electrode plate (cell) or polarizable electrode plate (capacitor) is obtained by adding a solution of a binder in a suitable solvent to an active material such as a carbonaceous material to prepare a paste-form coating formulation and then applying the coating formulation onto a collector. In the above-described coated electrode plate, the binder employed to prepare the coating formulation is required to be electrochemically stable to a nonaqueous electrolyte and to be free from dissolution into the electrolyte of the cell or capacitor, to remain free from substantial swelling by the electrolyte, and further to be soluble in a certain solvent to permit the coating.

On the other hand, it is practiced to form a protective film on a surface of a metal material such as aluminum, as a base metal material of a collector, by coating a solution of one of various resins. The resulting film is excellent in the adhesiveness to the metal surface, but is accompanied by a problem in that its durability to an organic solvent is insufficient.

In the electrode plate for the cell or capacitor, said electrode plate being obtained by applying the above-described coating formulation onto the surface of an aluminum foil, copper foil or the like as the collector, the coating film layer formed by the coating and drying is accompanied by problems in that its adhesiveness to the collector and its flexibility are insufficient, its contact resistance to the collector is high, and peeling, flaking, cracking and/or the like of the coating film layer takes place during assembly steps of the cell or capacitor or upon charging and discharging the same.

As described above, the conventional cell or capacitor is accompanied by the problems of the poor adhesion between the electrode layer and the collector (substrate) and the high internal resistance at the interface between the electrode layer and the substrate. A variety of coating formulations have been proposed to solve these problems. Coating film layers formed with these coating formulations lessen the adhesiveness problem, but make still higher the resistance between the electrode layer and the collector. Therefore, none of these coating formulations have led to a solution to the problems yet. In recent years, there is also an increasing demand for the manufacture of the above-described electricity storage devices such as lithium ion cells and electric double-layer capacitors and their related products with due consideration being paid to the environment. There is hence a demand for a coating formulation and electricity storage device making use of components, materials and a preparation/production method, which are low in environmental load.

PRIOR ART DOCUMENTS

Patent Documents

Patent Document 1: JP-A-2009-148681

Patent Document 2: JP-A-2009-26744

Patent Document 3: JP-A-2008-184485

Patent Document 4: JP-A-2009-238720

Patent Document 5: JP-A-63-10456

Patent Document 6: JP-A-3-285262

Non-patent Documents

Non-patent Document 1: FUJIYAMA, Mitsuyoshi: "Chapter I, Causes of Mixing and Dispersion Failures for Conductive Fillers", "New Mixing and Dispersion Technology for Conductive Fillers and Measures for Mixing and Dispersion Failures" in Japanese, Technical Information Institute Co., Ltd. p. 20 (2004)

Non-patent Document 2: TACHIBANA, Hirokazu: "Preparation, Coating and Drying of Positive Electrode Slurry for Lithium Ion Secondary Cells, and Understanding of Electrode Operations" in Japanese, Material Stage, Technical Information Institute Co., Ltd., 8(12), pp. 72-75 (2009)

Non-patent Document 3: JOE, Kiyokazu: "Technological Development of Dispersing Agents for Water Borne Coating Materials" in Japanese, JETI, 44(10), pp. 110-112 (1996)

Non-patent Document 4: KAMIYA, Hirohide: "Characterization and control of aggregation and dispersion behavior of fine powder in aqueous suspension" in Japanese, Material Stage, 2(1), pp. 54-60 (2002)

DISCLOSURE OF THE INVENTION

Problem to be Solved by the Invention

Therefore, an object of the present invention is to provide a useful, water-based, carbon filler-dispersed coating formulation by finding out a natural polymer, which can solve the above-described problems and which has an excellent dispersing function for a carbon filler, can also exhibit an excellent function as a binder, and enables the formation of a conductive coating film with excellent adhesiveness although it is a substance of biological origin that does not add much load on the environment. Described more specifically, an object of the present invention is to provide an economical, water-based, carbon filler-dispersed coating formulation, which retains its viscosity, is resistant to the occurrence of settling-out of the carbon filler and retains a high degree of dispersion even when stored over a long period of time. The provision of such a coating formulation makes it possible to form a conductive coating film of excellent adhesiveness with the carbon filler being uniformly dispersed therein. The water-based, carbon filler-dispersed coating formulation is hence expected to find utility not only in cells but also in many fields such as electronic materials, paints, inks, toners, rubbers and plastics, ceramics, magnetic materials, adhesives, and liquid-crystal color filters. In other words, an object of the present invention is to provide a technology that can contribute to the protection of environment and the prevention of health hazards, both of which have become objects of public concern, and can be used in many industrial fields. In particular, objects of the present invention are to provide an electrode plate for an electricity storage device and the electricity storage device including the electrode plate. The electrode plate is equipped with excellent adhesiveness to an interface between an electrode layer and a collector formed of an aluminum foil, copper foil or the like and superb electrolyte resistance owing to the use of the carbon filler-dispersed coating formulation for the electrode of the electricity storage device and the arrangement of a coating film, which has been formed from the coating formulation, between the collector and the electrode layer.

Means for Solving the Problem

The above-described objects can be achieved by the present invention to be described below. Described specifically, the present invention provides a water-based, carbon filler-dispersed coating formulation for forming a conductive coating film, comprising:
(1) a hydroxyalkyl chitosan as a resin binder,
(2) a conductive carbon filler, and
(3) a polybasic acid or a derivative thereof in a water-based medium containing at least water as a polar solvent,
wherein in 100 parts by mass of the coating formulation, the hydroxyalkyl chitosan (1) is contained in a range of from 0.1 to 20 parts by mass, and the conductive carbon filler (2) is contained in a range of from 1 to 30 parts by mass.

As preferred embodiments of the water-based, carbon filler-dispersed coating formulation according to the present invention, the water-based, carbon filler-dispersed coating formulations to be described hereinafter can be mentioned. The hydroxyalkyl chitosan may comprise at least one hydroxyalkyl chitosan selected from the group consisting of glycerylated chitosan, hydroxyethyl chitosan, hydroxypropyl chitosan, hydroxybutyl chitosan, and hydroxybutyl hydroxypropyl chitosan. The hydroxyalkyl chitosan may have a weight average molecular weight of from 2,000 to 350,000. The hydroxyalkyl chitosan may have a hydroxyalkylation degree of 0.5 or higher but 4 or lower. The polybasic acid and/or the derivative thereof is contained in a range of from 20 to 300 parts by mass per 100 parts by mass of the hydroxyalkyl chitosan.

The conductive carbon filler may be at least one conductive carbon filler selected from the group consisting of carbon black, acetylene black, Ketjenblack, furnace black, natural graphite, artificial graphite, carbon nanofibers and carbon nanotubes. The polybasic acid may be at least one polybasic acid selected from the group consisting of 1,2,3,4-butanetetracarboxylic acid, pyromellitic acid, citric acid, 1,2,3-propanetricarboxylic acid, 1,2,4-cyclohexanetricarboxylic acid, 1,2,4,5-cyclohexanetetracarboxylic acid, trimellitic acid, 1,4,5,8-naphthalenetetracarboxylic acid, and 1,2,3,4,5,6-cyclohexanehexacarboxylic acid. The water-based, carbon filler-dispersed coating formulation may further comprise at least one resin component, which is selected from polyvinyl alcohol, polyvinyl acetal, polyacrylic acid, fluorine-containing macromolecules, cellulose-based macromolecules, starch-based macromolecules, styrene-based polymers, acrylic polymers, styrene-acrylate ester copolymers, polyamides, polyimides and polyamide-imides, as a binder in a range of from 10 to 2,000 parts by mass per 100 parts by mass of the hydroxyalkyl chitosan.

In another aspect of the present invention, there is also provided a conductivity-imparting material comprising at least one substrate, which is selected from the group consisting of aluminum, copper, glass, natural resins, synthetic resins, ceramics, paper, fibers, woven fabrics, nonwoven fabrics and leather, and a coating film formed by coating and drying any of the above-described, water-based, carbon filler-dispersed coating formulations on a surface of the substrate.

In a further aspect of the present invention, there is also provided an electrode plate for an electricity storage device, which comprises a collector, an electrode active material layer, and a coating film formed from any of the above-described, water-based, carbon filler-dispersed coating formulations and arranged between the collector and the electrode active material layer.

As preferred embodiments of the electrode plate according to the present invention for the electricity storage device, the coating film may have a thickness of from 0.1 to 10 µm in terms of solids, and may have a surface resistivity of 3,000Ω/□ or lower. The collector may be an aluminum foil, and the electrode active material layer may comprise a positive-electrode active material. The collector may be a copper foil, and the electrode active material layer may comprise a negative-electrode active material. The collector may be an aluminum foil, and the electrode active material layer may comprise a polarizable electrode.

In a still further aspect of the present invention, there is also provided a process for producing an electrode plate for an electricity storage device, which comprises applying any of the above-described, water-based, carbon filler-dispersed coating formulations onto a surface of the collector to form a coating film, and then forming an electrode active material layer on the coating film. As a preferred embodiment of the process for producing the electrode plate for the electricity storage device, upon forming the coating film, heat treatment may be conducted at 100° C. or higher but 250° C. or lower for 1 second or longer but 60 minutes or shorter after or while removing the water-based medium under heat subsequent to the application of the coating formulation.

In an even still further aspect of the present invention, there is also provided an electricity storage device comprising any of the above-described electrode plates. As the electricity storage device, a secondary cell such as a lithium ion cell, or a capacitor such as an electric double layer capacitor or lithium ion capacitor can be mentioned.

Advantageous Effects of the Invention

According to the present invention, a coating formulation with a hydroxyalkyl chitosan such as glycerylated chitosan contained therein is provided. Although the hydroxyalkyl chitosan is a natural polymer of biological origin that does not add much load on the environment, it has an excellent dispersing function for the carbon filler and a function as a resin binder in combination. Therefore, the coating formulation is reduced in the settling-out of the carbon filler, and is quipped with high dispersion properties and dispersion stability. According to the present invention, the use of the coating formulation enables to provide a conductive coating film which contains a uniformly-dispersed carbon filler and is excellent in adhesiveness and also in solvent resistance. According to the present invention, an electrode plate for an electricity storage device and the electricity storage device including the electrode plate are provided. The electrode plate is equipped with excellent adhesiveness to an interface between an electrode layer and a col lector formed of an aluminum foil, copper foil or the like and superb electrolyte resistance, especially owing to the use of the carbon filler-dispersed coating formulation for the electrode of the electricity storage device and the arrangement of a coating film, which has been formed from the coating formulation, between the collector and the electrode layer. As the above-described, carbon filler-dispersed coating formulation is expected to find utility in many fields, the present invention can contribute to the protection of environment and the prevention of health hazards, both of which have become objects of international public concern in recent years.

MODES FOR CARRYING OUT THE INVENTION

The present invention will next be described in further detail based on preferred modes for carrying out the invention.

As a result of enthusiastic research conducted to solve the problems of the conventional technologies, the present inventors found that a water-based coating formulation, which contains a hydroxyalkyl chitosan, a substance of biological origin, as a resin binder therein, can afford a water-based coating film excel lent in adhesiveness and electrolyte resistance, and moreover, that the hydroxyalkyl chitosan exhibits superb dispersing ability for a carbon filler and is a useful material that can also function well as a dispersant.

(1) Hydroxyalkyl Chitosan

A description will hereinafter be made about the hydroxyalkyl chitosan that characterizes the present invention. The hydroxyalkyl chitosan for use in the present invention is a natural polymer of biological origin, and does not add much load on the environment. Particularly preferred in the present invention is one selected from the group consisting of hydroxyethyl chitosan, hydroxypropyl chitosan, hydroxybutyl chitosan, hydroxybutyl hydroxypropyl chitosan, and glycerylated chitosan.

The hydroxyalkyl chitosan that characterizes the present invention has a structure that an alkylene oxide or oxiranemethanol is added to the amino group of chitosan, and one produced by reacting chitosan with the alkylene oxide or oxiranemethanol is preferred. It is, however, to be noted that the hydroxyalkyl chitosan for use in the present invention is not limited to such a hydroxyalkyl chitosan and a hydroxyalkyl chitosan produced by another process can also be used likewise. As the above-described alkylene oxide or oxiranemethanol, a single alkylene oxide or oxiranemethanol may be used, or plural alkylene oxides or oxiranemethanols may be used in combination.

When producing a hydroxyalkyl chitosan for use in the present invention by reacting chitosan and the corresponding alkylene oxide, hydroxybutyl chitosan, for example, can be obtained by first dispersing chitosan in a water-containing isopropyl alcohol or the like under stirring, adding sodium hydroxide and butylene oxide to the dispersion, and then stirring the resulting mixture under heat.

When producing glycerylated chitosan for use in the present invention by reacting chitosan and the corresponding oxiranemethanol, on the other hand, the glycerylated chitosan can be obtained by dispersing chitosan beforehand, for example, in water-containing isopropyl alcohol or the like under stirring, adding the oxiranemethanol to the dispersion, and then stirring the resulting mixture under heat.

As the hydroxyalkyl chitosan for use in the present invention, a hydroxyalkyl chitosan having a hydroxyalkylation degree in a range of 0.5 or greater but 4 or smaller can be suitably used from the standpoint of the dispersing ability for the carbon filler. The term "hydroxyalkylation degree (no unit)" means the degree of addition of a corresponding alkylene oxide or oxiranemethanol to chitosan. Described specifically, it is preferred in the present invention that the hydroxylation degree is 0.5 mole or greater but 4 moles or smaller per pyranose ring (mole of pyranose) that makes up chitosan. To obtain such a hydroxyalkylation degree, it is desired to add and react 0.6 mole or greater but 10 moles or smaller of the alkylene oxide or oxiranemethanol per pyranose ring (mole of pyranose) that makes up chitosan. If the hydroxylation degree of a hydroxyalkyl chitosan to be used is 0.5 or smaller, the hydroxyalkyl chitosan is insufficient from the standpoints of the dispersing ability for the carbon filler and the stability of a slurry after dispersion. Even when the hydroxylation degree exceeds 4, on the other hand, the dispersing ability for the carbon filler does not change so that the setting of the hydroxyalkylation degree beyond 4 is uneconomical.

Further, it is preferred in the present invention to use a hydroxyalkyl chitosan having a weight average molecular weight in a range of 2,000 or higher but 350,000 or lower, especially a hydroxyalkyl chitosan having a weight average molecular weight of 5,000 or higher but 250,000 or lower. A weight average molecular weight lower than 2,000 is not preferred in that the hydroxyalkyl chitosan is insufficient in the dispersing ability for the carbon filler. A weight average molecular weight higher than 350,000, on the other hand, is not preferred either in that it provides the dispersant with an increased viscosity and that, when a dispersion such as a slurry is prepared using the dispersant, the solids concentration of the carbon filler in the dispersion can be hardly raised.

(2) Conductive Carbon Filler

The water-based, carbon filler-dispersed coating formulation according to the present invention contains the above-described hydroxyalkyl chitosan as a resin binder, and also contains at least a conductive carbon filler together with the hydroxyalkyl chitosan. Further, the carbon filler is dispersed in a water-based medium that contains at least water as a polar solvent. As the conductive carbon filler to be used upon preparation of the water-based, carbon filler-dispersed coating formulation, those in the forms of particles, flakes and short fibers are all usable. Particulate conductive carbon fillers include carbon black, acetylene black, Ketjenblack, furnace black, and the like. Flaky conductive carbon fillers include natural graphite, kish graphite, artificial (man-made) graphite, and the like. Conductive carbon fillers in the form of short fibers include PAN-based carbon fibers, pitch-based carbon fibers, carbon nanofibers, carbon nanotubes, and the like. As more suitably usable carbon fillers, carbon black, acetylene black, Ketjenblack, furnace black, natural graphite, artificial (man-made) graphite, kish graphite, carbon nanofibers, carbon nanotubes and the like can be mentioned.

The content of the above-described conductive carbon filler in the water-based, carbon filler-dispersed coating formulation according to the present invention is from 1 to 30 parts by mass, more preferably from 1 to 20 parts by mass, still more preferably from 1 to 15 parts by mass per 100 parts by mass of the coating formulation. If the content of the carbon filler is smaller than the lower limit, the resulting coating film layer may become insufficient in conductivity. If the content of the carbon filler is greater than the upper limit, on the other hand, one or more of the remaining components may become insufficient so that the resulting coating film layer may be reduced in performance.

(3) Polybasic Acid or Derivative Thereof

The carbon filler-dispersed coating formulation according to the present invention contains a polybasic acid or a derivative thereof (hereinafter called "the polybasic acid or the like") as an essential component. Owing to the inclusion of the polybasic acid or the like, the polybasic acid and/or the derivative thereof acts as a crosslinking agent for the hydroxyalkyl chitosan and one or more resin components, which may be added as desired, when the coating formulation according to the present invention is applied and is then heated and dried. As a result, the resulting coating film is provided with excellent adhesiveness to a substrate, especially the surface of a metal material or a collector, and also with superb solvent resistance.

As the polybasic acid or the like for use in the formation of the coating film, one known to date can be used. Specifically, usable are polybasic acids themselves and acid anhydrides thereof; salts, notably ammonium salts and amine salts of some or all of the carboxyl groups of such polybasic acids; alkyl esters, amides, imides and amide-imides of some or all of the carboxyl groups of such polybasic acids; derivatives obtained by modifying ones or more of the carboxyl groups of these compounds with N-hydroxysuccinimide, N-hydroxysulfosuccinimide or a derivative thereof; and the like. Preferred as the derivatives of these polybasic acids are compounds which regenerate the polybasic acids upon heating of coating film layers to be formed subsequently from the coating formulations.

As the polybasic acid or the like for use in the present invention, it is preferred to use a dibasic or higher, especially a tribasic or higher polybasic acid from the standpoint of crosslinking ability for the hydroxyalkyl chitosan and one or more resin components, which may be added as desired, employed as resin binders. Described specifically, it is preferred to use at least one polybasic acid, which is selected from the group consisting of the below-described polybasic acids, or its derivative, especially its acid anhydride.

<Dibasic acids> Oxalic acid, malonic acid, succinic acid, methylsuccinic acid, glutaric acid, methylglutaric acid, adipic acid, pimellic acid, suberic acid, azelaic acid, sebacic acid, maleic acid, methylmaleic acid, fumaric acid, methylfumaric acid, itaconic acid, muconic acid, citraconic acid, glutaconic acid, acetylenedicarboxylic acid, tartaric acid, malic acid, spiclisporic acid, glutamic acid, glutathione, aspartic acid, cystine, acetylcysteine, diglycolic acid, iminodiacetic acid, hydroxyethyliminodiacetic acid, thioglycolic acid, thionyldiglycolic acid, sulfonyldiglycolic acid, poly(oxyethylene)diglycolic acid (PEG acid), pyridinedicarboxylic acid, pyrazinedicarboxylic acid, epoxysuccinic acid, phthalic acid, isophthalic acid, terephthalic acid, tetrachlorophthalic acid, naphthalene dicarboxylic acid, tetrahydrophthalic acid, methyltetrahydrophthalic acid, cyclohexane dicarboxylic acid, diphenylsulfone dicarboxylic acid, and diphenylmethane dicarboxylic acid;

<Tribasic acids> Citric acid, 1,2,3-propanetricarboxylic acid, 1,2,4-butanetricarboxylic acid, 2-phosphono-1,2,4-butanetricarboxylic acid, trimellitic acid, and 1,2,4-cyclohexanetricarboxylic acid;

<Tetrabasic acids> Ethylenediaminetetraacetic acid, 1,2,3,4-butanetetracarboxylic acid, pyromellitic acid, 1,2,4,5-cyclohexanetetracarboxylic acid, and 1,4,5,8-naphthalenetetracarboxylic acid; and <Hexabasic Acids>1,2,3,4,5,6-Cyclohexanehexacarboxylic acid.

It is to be noted that in addition to the above-described polybasic acids, other polybasic acids such as those to be described below may also be used in combination in the present invention. Illustrative are tribasic acids such as isocitric acid, aconitic acid, nitrilotriacetic acid, hydroxyethylethylenediaminetriacetic acid, carboxyethylthiosuccinic acid, and trimesic acid; monocyclic tetracarboxylic acids such as ethylenediamine-N,N'-succinic acid, pentenetetracarboxylic acid, hexenetetracarboxylic acid, glutamate diacetic acid, maleated methylcyclohexenetetracarboxylic acid, furantetracarboxylic acid, benzophenonetetracarboxylic acid, phthalocyaninetetracarboxylic acid, 1,2,3,4-cyclobutanetetracarboxylic acid, and cyclopentanetetracarboxylic acid; tetrabasic acids such as polycyclic tetracarboxylic acids having a bicyclo ring, norbornane ring or tetracycloring structure, represented by bicyclo[2,2,1]heptane-2,3,5,6-tetracarboxylic acid and bicyclo[2,2,2]octane-2,3,5,6-tetracarboxylic acid; pentabasic acids such as diethylenetriamine pentaacetic acid; phthalocyanine polycarboxylic acid, phytic acid, hexametaphosphoric acid, polyphosphoric acid, polyacrylic acid, polymethacrylic acid, polyitaconic acid, polymaleic acid, and copolymers thereof; styrene-maleic acid copolymer, isobutylene-maleic acid copolymer, vinyl ether-maleic acid copolymer, pectic acid, polyglutamic acid, polymalic acid, polyaspartic acid, acrylic acid-maleic acid-vinyl alcohol copolymer; and the like.

The content of the polybasic acid or the like in the coating formulation according to the present invention may be preferably from 20 to 300 parts by mass, more preferably from 50 to 200 parts by mass per 100 parts by mass of the hydroxyalkyl chitosan. On the other hand, the content of the derivative of the polybasic acid or the like per 100 parts by mass of the coating formulation may be preferably from 0.01 to 20 parts by mass, more preferably from 0.02 to 10 parts by mass. If the content of the polybasic acid or the like is lower than 0.01 parts by mass in this instance, the resulting carbon filler-containing, composite material is insufficient in the adhesiveness to a substrate and the insolubility and non-swellability to organic solvents. Such an excessively low content is thus not preferred. On the other hand, a content higher than 20 parts by mass provides the resulting film or carbon filler-containing composite material with reduced flexibility, and moreover, is uneconomical. Such an unduly high content is hence not preferred either.

(4) Water-based Medium

The carbon filler-dispersed coating formulation according to the present invention contains the above-described hydroxyalkyl chitosan, conductive carbon filler and polybasic acid or the like dissolved or dispersed in a water-based medium that contains at least water as a polar solvent. As the water-based dispersion medium that makes up the present invention, a mixed dispersion medium formed by mixing water and an organic solvent miscible with water can also be suitably used besides water. As the organic solvent miscible with water, conventionally-known organic solvents such as those to be described below can be used. Examples include alcohols such as methyl alcohol, ethyl alcohol, n-propyl alcohol, isopropyl alcohol (IPA), n-butyl alcohol, s-butyl alcohol, isobutyl alcohol and t-butyl alcohol; esters such as methyl acetate, ethyl acetate, n-propyl acetate, isopropyl acetate, n-butyl acetate, isobutyl acetate, methoxybutyl acetate, cellosolve acetate, amyl acetate, methyl lactate, ethyl lactate and butyl lactate; ketones such as acetone, methyl ethyl ketone, methyl isobutyl ketone, diisobutyl ketone and cyclohexanone; amides such as N-methyl-2-pyrrolidone, N,N-dimethylacetamide and N,N-dimethylformamide; and sulfoxides such as dimethyl sulfoxide. Among these, the alcohols are suitably usable, with IPA being usable especially suitably. These organic solvents miscible with water may be used either singly or as a mixture.

When such an organic solvent as described above is used in the water-based dispersion medium that makes up the carbon filler-dispersed coating formulation according to the present invention, no particular limitation is imposed on its content. For example, the organic solvent/water can be added in an amount of from 1 to 70 parts by mass as desired. More specifically, a mixed dispersion medium with the organic solvent contained in a range of from 5 to 60 parts by mass can be used more suitably. When a mixed dispersion medium of IPA/water is used, for example, the content of IPA may be set preferably at from 1 to 40 parts by mass, with a mixed dispersion medium containing from 5 to 40 parts by mass of IPA being more preferred.

The water-based, carbon filler-dispersed coating formulation according to the present invention is specifically of the makeup that based on 100 parts by mass of the coating formulation, the content of the hydroxyalkyl chitosan is from 0.1 to 20 parts by mass and the content of the conductive carbon filler is from 1 to 30 parts by mass.

(5) Other Resins which May be Added

When it is desired to provide the coating film, which is to be formed from the carbon filler-dispersed coating formulation according to the present invention, with physical strength, durability, abrasion resistance, adhesiveness to substrates, and the like, one or more other resin components can be added as binders for the coating film. As other resin components usable in the carbon filler-dispersed coating formulation according to the present invention, conventionally-known resins can be mentioned, including polyvinyl alcohol, polyvinyl acetal, polyacrylic acid, fluorine-containing macromolecules, cellulose-based macromolecules, starch-based macromolecules, styrene-based polymers, acrylic polymers, styrene-acrylate ester copolymers, polyamides, polyimides and polyamide-imides. These resin components are available from the market, and can be used as they are. More preferred are, however, their derivatives prepared in view of the solubility to dispersion media.

The content of such a resin component may be from 10 to 2,000 parts by mass per 100 parts by mass of the hydroxyalkyl chitosan, with from 100 to 1,000 parts by mass being preferred. Further, the content of the resin component per 100 parts by mass of the coating formulation may range preferably from 1 to 40 parts by mass, more preferably from 5 to 20 parts by mass in terms of solids content. In this instance, a content of the resin component lower than 1 parts by mass provides the resulting coating film layer with insufficient strength and insufficient adhesiveness to a substrate so that the components of the coating film tend to falloff from the coating film layer. A content of the resin component higher than 40 parts by mass, on the other hand, makes it difficult to obtain a uniform solution, and moreover, the carbon filler as a dispersoid is covered under the resin component so that the function which the carbon filler has may not be exhibited fully.

When the resin component is added to the carbon filler-dispersed coating formulation according to the present invention and a coating film layer is formed by using this coating formulation, the polybasic acid or the like acts as a crosslinking agent for the hydroxyalkyl chitosan and one or more other resin components which may be added as desired, thereby making it possible to form a coating film layer having excellent adhesiveness to a substrate, especially the surface of a metal material or a collector and superb solvent resistance.

When such one or more resin components as described above are used, the content of the polybasic acid or the like in the coating formulation may be preferably from 1 to 150 parts by mass, more preferably from 2 to 100 parts by mass per 100 parts by mass of the resin components. If the content of the polybasic acid or the like is lower than 1 parts by mass, each cross linked polymer is provided with a low crosslink density, and the resulting coating film layer is insufficient in the adhesiveness to the collector and the polymer is insufficient in the insolubility, non-swellability and electrochemical stability to the electrolyte. On the other hand, a content higher than 150 parts by mass provides the resulting film or coating film layer with reduced flexibility, and moreover, is uneconomical.

(Preparation, Etc. of Carbon Filler-dispersed Coating Formulation)

As the polybasic acid or the like and the organic solvent for use in the carbon filler-dispersed coating formulation in the present invention, those available on the market can be used as they are, or may be used after purification as needed. As the order of addition of polymers such as the hydroxyalkyl chitosan and each resin component, which may be added as needed, and the polybasic acid or the like to the water-based dispersion medium upon their dissolution in the water-based dispersion medium in the production of the coating formulation, either of the polymer(s) and the polybasic acid or the like may be added first or both of them may be added concurrently. As a dissolution method, room-temperature stirring is sufficient, but heating may also be conducted as needed.

The carbon filler-dispersed coating formulation according to the present invention can be obtained by adding the hydroxyalkyl chitosan and conductive filler, the polybasic acid or the like, and further, the one or more resin components, which may be added as reinforcement components for the coating film as needed, to the dispersion medium, and kneading the resulting mixture. As the proportions of the respective components in the coating formulation, it is particularly preferred that, when the coating formulation is assumed to be 100 parts by mass, the hydroxyalkyl chitosan amounts to from 0.1 to 20 parts by mass, the carbon filler amounts to 1 to 30 parts by mass, the one or more other resin components amount to from 0.1 to 20 parts by mass, and the polybasic acid or the like amounts to from 0.05 to 20 parts by mass. Further, the solids content of the coating formulation may range preferably from 1 to 40 parts by mass.

The carbon filler-dispersed formulation according to the present invention can also contain one or more optional components other than the above-described components, for example, one or more of other crosslinking agents and the like. Examples of the other crosslinking agents include epoxy compounds such as ethylene glycol diglycidyl ether, polyethylene glycol diglycidyl ether and glycerol polyglycidyl ether; isocyanate compounds such as toluoylene diisocyanate, xylylene diisocyanate, hexamethylene diisocyanate and phenyl diisocyanate, and blocked isocyanate compounds formed by blocking such isocyanate compounds with blocking agents such as phenols, alcohols, active methylene compounds, mercaptans, acid-amides, imides, amines, imidazoles, ureas, carbamic acids, imines, oximes or sulfites; and aldehyde compounds such as glyoxal, glutaraldehyde, and dialdehyde starch.

Also included are (meth)acrylate compounds such as polyethylene glycol diacrylate, polyethylene glycol dimethacrylate and hexanediol diacrylate; methylol compounds such as methylolmelamine and dimethylol urea; organic acid metal salts such as zirconyl acetate, zirconyl carbonate and titanium lactate; and metal alkoxide compounds such as aluminum trimethoxide, aluminum tributoxide, titanium tetraethoxide, titanium tetrabutoxide, zirconium tetrabutoxide, aluminum dipropoxide acetylacetonate, titanium dimethoxide bis(acetylacetonate) and titanium dibutoxide bis(ethylacetoacetate).

Further included are silane coupling agents such as vinylmethoxysilane, vinylethoxysilane, 3-glycidoxypropyltrimethoxysilane, 3-glycidoxypropyltriethoxysilane, 3-methacryloxypropyltrimethoxysilane, 3-aminopropyltrimethoxysilane, 3-aminopropyltriethoxysilane, 3-isocyanatopropyltriethoxysilane and imidazolesilane; silane compounds such as methyltrimethoxysilane, tetraethoxysilane and methyltriethoxysilane; and carbodiimide compounds and the like. The use of these crosslinking agents is not essential. When they are used, however, the content of one or more of such crosslinking agents may suitably range from 1 to 100 parts by mass based on the content of the hydroxyalkyl chitosan plus the content of the resin component.

A description will now be made about a specific method for the preparation of the carbon filler-dispersed coating formulation according to the present invention. First, the coating formulation is prepared by adding the hydroxyalkyl chitosan, the carbon filler, the polybasic acid or the like, and if necessary, the resin component or components to the water-based dispersion medium such that they are proportioned as described above, and mixing and dispersing them in a conventionally-known mixer. As the mixer, a ball mill, sand mill, pigment disperser, mix-muller, ultrasonic disperser, homogenizer, planetary mixer, Hobart mixer, or the like can be used. Also preferred is a method that firstly mixes the carbon filler in a mixer such as a mix-muller, planetary mixer, Henschel mixer or omni-mixer, adds the hydroxyalkyl chitosan and, if necessary, the resin component or components, and the polybasic acid or the like, and then mixes them until homogeneous. The adoption of such a method makes it possible to readily obtain a uniform coating formulation.

No particular limitation is imposed on the amounts of the coating formulation upon its application onto various substrates. In general, however, the coating formulation may be applied in such an amount that the coating film layer to be formed subsequent to drying will have a thickness of usually from 0.05 to 100 µm, preferably from 0.1 to 10 µm.

<Conductivity Imparting Material>

The present invention provides a conductivity-imparting material, which is obtained by applying the carbon filler-dispersed coating formulation of the above-described makeup onto a surface of a substrate and drying the same. As the substrate, a metal such as aluminum or copper, glass, a natural resin, a synthetic resin, ceramics, paper, fibers, a woven fabric, a nonwoven fabric, a leather or the like can be mentioned. As a preferred substrate, however, a collector for an electricity storage device, such as an aluminum foil or copper foil can be mentioned.

<Electrode Plate for Electricity Storage Device>

The carbon filler-dispersed coating formulation according to the present invention can be used on an electrode plate for an electricity storage device. In this case, the carbon filler-dispersed coating formulation according to the present invention can be applied onto a surface of a collector for an electricity storage device to a thickness of from 0.1 to 10 µm, preferably from 0.1 to 5 µm, more preferably from 0.1 to 2 µm in terms of solids to form a coating film layer. By further forming a positive electrode layer for a cell, a negative electrode layer for the cell, a positive electrode layer for a capacitor, a negative electrode layer for the capacitor or a polarizable electrode layer over the coating film layer, the adhesiveness between the electrode layer and the collector can be significantly improved without increasing the resistance at all between the electrode layer and the collector but while rather lowering the resistance.

In the present invention, there are also provided electrode plates for a cell or capacitor, said electrode plates being each characterized in that a coating film layer formed from the coating formulation is formed and arranged between a collector and an electrode layer, and the cell (secondary cell) or capacitor characterized by having the electrode plates.

The binder for forming the electrode layer in each of the above-described electrode plates may be a solution of the resin component useful in the carbon filler-dispersed coating formulation of the present invention, or may be a conventionally-known binder. Illustrative are polyfluorinated vinylidene, polytetrafluoroethylene, acrylic resins, polyimide resins, polyamide-imide resins, silicone-acrylic resins, styrene-butadiene copolymer rubber, and the like. In the case of such a conventionally-known binder as described above, it has heretofore been essential to subject, for example, the surface of an aluminum foil to chemical treatment to provide improved adhesion between the electrode layer and the collector. However, the use of the coating formulation according to the present invention can obviate such cumbersome and high cost chemical treatment, and can realize still better adhesion and lower resistance. High-efficiency and long-life, cells and capacitors can be provided accordingly.

Further, the coating film formed by the carbon filler-dispersed coating formulation according to the present invention may preferably have a surface resistivity of 3,000Ω/□ or lower. Described specifically, if a coating film having a surface resistivity higher than 3,000Ω/□ is used in an electrode plate, the internal resistance increases, thereby making it difficult to obtain a high-efficiency and long-life, cell or capacitor. It is, therefore, preferred in the present invention to form a coating film the surface resistivity of which is 3,000Ω/□ or lower, more desirably 1,000Ω/□ or lower.

(Measurement of Surface Resistivity)

The surface resistivity that specifies each coating film In the present invention was measured by a method to be described next. After a coating formulation for the formation of a coating film in the present invention is applied onto a glass plate, the coating formulation is dried at 200° C. for 1 minute to form the coating film (dry film thickness: 4 µm). The surface resistivity of the coating film is then determined by the four-point probe method in accordance with JIS K 7194. In the present invention, the measurement was conducted under conditions of 25° C. and 60% relative humidity by using a "LORESTA-GP MCP-T610" (manufactured by Mitsubishi Chemical Analytech Co., Ltd.).

The carbon filler-dispersed coating formulation according to the present invention contains, in a water-based medium, resins having hydroxyl groups and/or amino groups, such as the hydroxyalkyl chitosan and polyvinyl alcohol which may be added as needed, and the polybasic acid or the like. Conventionally, a polymer having hydroxyl groups or amino groups in its molecule is known to afford films having excellent adhesiveness to metal materials such as aluminum. However, these films involve a problem in that they swell, for example, with a polar solvent such as water or N-methylpyrrolidone and readily separate from the surfaces of such metal materials. Further, the use of such a polymer as a binder in a coating formulation for the production of electrode plates involves a problem in that the durability (electrolyte resistance) of the resulting coating film layer to a cell electrolyte such as ethylene carbonate or propylene carbonate is low, although the adhesiveness of the coating film layer to the collector is excellent.

The present inventors conducted research with a view to providing films, which are to be formed from the above-described polymers, with improved resistance to organic solvents. As a result, it has been found that a coating formulation—which is prepared by adding polymers, which include the hydroxyalkyl chitosan, together with a polybasic acid or the like to a polar solvent as described above—affords a film having excellent adhesiveness to the surface of a metal material, superb solvent resistance and splendid durability. It has also been found that, when the coating formulation is used to form a coating film layer, the polybasic acid or the like incorporated in the coating formulation acts as a crosslinking agent for the polymers including the hydroxyalkyl chitosan during drying under heat and the film formed from the polymers is no longer equipped with solubility and swellability to an organic solvent and electrolyte and becomes a coating layer having excellent adhesiveness to the surface of the metal material or the collector and superb solvent resistance.

The production method of an electrode plate in the present invention is characterized in that with the carbon filler-dispersed coating formulation of the above-described makeup according to the present invention, a coating film is formed and arranged between a collector and an electrode in an electricity storage device such as a secondary cell or capacitor. As the collector useful in the production of the electrode plate, a material having electrical conductivity and electrochemical durability is used. Among such materials, preferred are metal materials such as aluminum, tantalum, niobium, titanium, nickel, hafnium, zirconium, zinc, tungsten, bismuth, antimony, stainless steel, copper, gold and platinum, with aluminum and copper being particularly preferred as they have excellent corrosion resistance to the electrolyte, are lightweight, and permit easy machining. No particular limitation is imposed on the shape of the collector. In general, however, a sheet-shaped collector (metal foil) having a thickness of from 5 to 30 µm or so can be employed. Such a collector may be treated beforehand at a surface thereof with a silane-based, titanate-based or aluminum-based coupling agent.

The coating film layer, which is equipped with such excellent characteristics as mentioned above, can be obtained by applying the coating formulation of the present invention onto the surface of the collector in a range of from 0:1 to 10 µm, preferably from 0.1 to 5 µm, more preferably from 0.1 to 2 µm in terms of solids (dry thickness) by using one of various coating methods such as gravure coating, gravure reverse coating, roll coating, Meyer bar coating, blade coating, knife coating, air knife coating, comma coating, slot die coating, slide die coating, dip coating, extrusion coating, spray coating and brush coating, and subsequently drying the thus-applied coating formulation under heat. If the thickness of the coating film is smaller than 0.1 µm, uniform coating is difficult. A thickness greater than 10 µm, on the other hand, may provide the resulting coating film with reduced flexibility.

Upon drying under heat, the coating film layer may be heated preferably at 100° C. or higher for 1 second or longer, more preferably at 100° C. or higher but 250° C. or lower for 1 second or longer but 60 minutes or shorter. Insofar as these conditions are met, the polymers in the coating formulation, such as the hydroxyalkyl chitosan and the one or more resin components which may be added as needed, can be fully crosslinked to provide the resulting coating film layer with improved adhesiveness to the collector and also to provide the polymers with improved electrochemical stability to the electrolyte. A heat treatment condition of lower than 100° C. or shorter than 1 second may fail to provide the coating film layer with satisfactory adhesiveness to the collector and also to provide the polymers with satisfactory electrochemical stability to the electrolyte. Such a heat treatment condition is hence not preferred.

In addition, an electrode layer is applied over the coating film layer, which has been formed by conducting coating and drying processing of the coating formulation as described above, to form an electrode plate. To further improve its uniformity, it is also preferred to form the electrode plate according to the present invention by applying pressing treatment to the electrode layer while using metal rolls, heating rolls, a sheet press or the like. As a pressing condition for the pressing treatment, a range of from 500 to 7,500 kgf/cm$^2$ is preferred, because a press pressure of lower than 500 kgf/cm$^2$ can hardly provide the electrode layer with uniformity while a press pressure of higher than 7,500 kgf/cm$^2$ involves a potential problem of breaking the electrode plate itself including the collector.

In the electrode plate obtained as described above, the coating film layer, which is made of the carbon filler adequately dispersed with the hydroxyalkyl chitosan and the polymers such as the hydroxyalkyl chitosan and one or more resin components crosslinked with the polybasic acid or the like, is formed and arranged on the collector as a substrate, and the coating film layer is equipped with such properties as described above.

<Electricity Storage Device>

(Secondary Cell)

When manufacturing a nonaqueous electrolyte secondary cell, for example, a lithium-based secondary cell by using the positive and negative electrode plates of the present invention produced as described above, a nonaqueous electrolyte with a lithium salt dissolved as a solute in such an organic solvent as will be described below or an ionic liquid is used as an electrolyte. Usable examples of the lithium salt as the solute that forms the nonaqueous electrolyte include inorganic lithium salts such as $LiClO_4$, $LiBF_4$, $LiPF_6$, $LiAsF_6$, LiCl and LiBr; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$ and $LiOSO_2C_7F_{15}$.

As the organic solvent, a cyclic ester, a linear ester, a cyclic ether, a linear ether or the like can be used. Illustrative of the cyclic ester are ethylene carbonate, propylene carbonate, butylene carbonate, γ-butyrolactone, vinylene carbonate, 2-methyl-γ-butyrolactone, acetyl-γ-butyrolactone, and γ-valerolactone.

Illustrative of the linear ester are dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates.

Illustrative of the cyclic ether are tetrahydrofuran, alkyltetrahydrofurans, dialkylalkyltetrahydrofurans, alkoxytetrahydrofurans, dialkoxytetrahydrofurans, 1,3-dioxolane, alkyl-1,3-dioxolanes, and 1,4-dioxolane. Illustrative of the linear ether are 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers.

The ionic liquid in which the lithium salt is dissolved is a liquid formed solely of ions consisting of organic cations and anions in combination. The organic cations can be, for example, at least one kind of organic cations of dialkylimidazolium cations such as 1-ethyl-3-methylimidazolium ions, trialkylimidazolium cations such as 1,2-dimethyl-3-propylimidazolium ions, tetraalkylammonium ions such as dimethylethylmethoxyammonium ions, alkylpyridinium ions such as 1-butylpyridinium ions, dialkylpyrrolidinium ions such as methylpropylpyrrolidinium ions, and dialkylpiperidinium ions such as methylpropylpiperidinium ions.

As the anions to be paired with these organic cations, $AlCl_4^-$, $PF_6^-$, $PF_3(C_2F_5)_3^-$, $PF_3(CF_3)_3^-$, $BF_4^-$, $BF_2(CF_3)_2^-$, $BF_3(CF_3)^-$, $CF_3SO_3^-$ (TfO: triflate anions), $(CF_3SO_2)_2N^-$ (TFSI: trifluoromethanesulfonyl), $(FSO_2)_2N^-$ (FSI: fluorosulfonyl), $(CF_3SO_2)_3C^-$ (TFSM), or the like can be used. It is to be noted that the remaining construction of the cell is the same as in the conventional art.

(Capacitor)

A description will hereinafter be made about a case in which coating film layers formed from the carbon filler-dispersed coating formulation according to the present invention are used in the production of electrode plates for a capacitor and the capacitor. The coating formulation for the electrode plates of the capacitor also contains the water-based medium containing water, the hydroxyalkyl chitosan, the carbon filler, the polybasic acid or the like, the one or more resin components which may be added as needed, and the like.

The content of the hydroxyalkyl chitosan as a resin binder in the coating formulation used upon formation of the coating films may be preferably from 0.1 to 20 parts by mass, more preferably from 0.5 to 10 parts by mass per 100 parts by mass of the coating formulation. An unduly low content of the hydroxyalkyl chitosan makes the components of each coating film easier to fall off from the coating film layer, and therefore, is not preferred. An excessively high content of the hydroxyalkyl chitosan, on the other hand, involves a potential problem in that the carbon filler may be covered under the resin components to provide the electrode plate with an increased internal resistance, and therefore, is not preferred either.

As the polybasic acid or the like, a conventionally-known free polybasic acid or its derivative can be used. From the standpoint of crosslinking ability for the polymer components including the hydroxyalkyl chitosan used as a resin binder, dibasic and higher, especially tribasic and higher, polybasic acids and the like are preferred. Those preferred for use in the present invention include 1,2,3-propanetricarboxylic acid, 1,2,4-cyclohexanetricarboxylic acid, 1,2,4,5-cyclohexanetetracarboxylic acid, 1,2,3,4-butanetetracarboxylic acid, trimellitic acid, pyromellitic acid, 1,4,5,8-naphthalenetetracarboxylic acid and 1,2,3,4,5,6-cyclohexanehexacarboxylic acid, and their acid anhydrides. These polybasic acids and the like are each used by mixing it in the above-described coating formulation.

The content of the polybasic acid or the like in the coating formulation to be used upon formation of each coating film may be preferably from 1 to 200 parts by mass, more preferably from 2 to 100 parts by mass per 100 parts by mass of the polymer components including the hydroxyalkyl chitosan. If the content of the polybasic acid or the like is lower than 1 parts by mass, the cross linked polymer is provided with a low crosslink density, and the resulting coating film layer may be insufficient in the adhesiveness to the collector and the crosslinked polymer may be insufficient in insolubility, non-swellability and electrochemical stability to the electrolyte. Such an excessively low content is thus not preferred. On the other hand, a content higher than 150 parts by mass provides the resulting film or coating film layer with reduced flexibility and moreover, is uneconomical. Such an unduly high content is hence not preferred either.

As the carbon filler, a conductive carbon such as acetylene black, Ketjenblack or carbon black can be used. These conductive fillers are each used by mixing it in the above-described coating formulation. The carbon filler has a role to provide the coating film with an improved electrical contact and to provide the capacitor with a reduced internal resistance and an increased capacity density. The content of the carbon filler may range generally from 1 to 20 parts by mass, preferably from 2 to 10 parts by mass per 100 parts by mass of the coating formulation.

The coating formulation can be prepared by mixing, in a mixer, the hydroxyalkyl chitosan, the carbon filler, the polybasic acid or the like, and the resin component which may be added as needed. As the mixer, a ball mill, sand mill, pigment disperser, mix-muller, ultrasonic disperser, homogenizer, planetary mixer, Hobart mixer, or the like can be used. Also preferred is a method that firstly mixes the carbon filler in a mixer such as a mix-muller, planetary mixer, Henschel mixer or omni-mixer, adds the solution of the polymer component as a resin binder to the resultant mixture, and then mixes them until homogeneous. The adoption of this method makes it possible to readily obtain a uniform coating formulation.

The capacitor electrode plate according to the present invention is obtained by applying the coating formulation of the present invention—which contains the hydroxyalkyl chitosan as a resin binder, the carbon filler, the polybasic acid or the like, and the other resin component which may be added as needed—between a collector and an electrode layer, and then drying the coating formulation to form a coating film layer. As the collector, a material having electrical conductivity and electrochemical durability can be used. From the viewpoint of the possession of heat resistance, a metal material such as aluminum, titanium, tantalum, stainless steel, gold or platinum is preferred, with aluminum or platinum being particularly preferred. No particular limitation is imposed on the shape of the collector. In general, however, a sheet-shaped collector having a thickness of from 0.001 to 0.5 mm or so can be employed.

No particular limitation is imposed on the forming method of the coating film layer. Preferred is a method that applies the carbon filler-dispersed coating formulation for the capacitor electrode between the collector and the electrode layer, and then dries the coating formulation to form the coating film layer between the collector and the electrode layer. As an application method of the coating formulation, a method such as, for example, doctor blade coating, dip coating, reverse roll coating, direct roll coating, gravure coating, extrusion coating, brush coating or spray coating can be mentioned.

The viscosity of the coating formulation in the above-described case may be generally from 10 to 100,000 mPa·s, preferably from 50 to 50,000 mPa·s, more preferably from 100 to 20,000 mPa·s, although it differs depending on the type of the coating machine and the layout of the coating line. No particular limitation is imposed on the amount of the coating formulation to be applied. In general, however, the coating formulation may be applied in such an amount that the coating film layer to be formed subsequent to the elimination of the solvent by drying will have a thickness of usually from 0.05 to 100 μm, preferably from 0.1 to 10 μm. The drying method and drying conditions for the coating film layer are similar to those described above in connection with the cell electrode plates.

The capacitor according to the present invention, which has the above-described electrode plates, can be manufactured in a usual manner by using parts such as the above-described electrode plates, electrolyte and separator. Described specifically, it can be manufactured, for example, by stacking the electrode plates together with the separator interposed therebetween, rolling or folding the resultant stack into a form conforming to the capacitor, placing the rolled or folded stack in a can, filling the electrolyte into the can, and sealing the can.

The electrolyte may preferably be, but is not limited particularly to, a nonaqueous electrolyte with an electrolyte dissolved in an organic solvent. As an electrolyte for an electric double-layer capacitor, for example, any electrolyte known to date can be used. Illustrative are tetraethylammonium tetrafluoroborate, triethylmonomethylammonium tetrafluoroborate, tetraethylammonium hexafluorophosphate, and the like. As an electrolyte for a lithium ion capacitor, on the other hand, a lithium salt such as LiI, $LiClO_4$, $LiAsF_6$, $LiBF_4$ or $LiPF_6$ can be mentioned.

No particular limitation is imposed on the solvent (electrolyte solvent) for dissolving such an electrolyte, insofar as it is commonly employed as an electrolyte solvent. Specific examples include carbonates such as propylene carbonate, ethylene carbonate and butylene carbonate; lactones such as γ-butyrolactone; sulfolanes; and nitriles such as acetonitrile. They can be used either singly or as a mixed solvent of two or more of them. Among these, carbonates are preferred for their high withstand voltage. The concentration of the electrolyte may be generally 0.5 mole/L or higher, preferably 0.8 mole/L or higher.

As the separator, a known separator can be used such as a microporous membrane or nonwoven fabric made of a polyolefin such as polyethylene or polypropylene; or a porous membrane made of pulp as a primary raw material and generally called "electrolytic capacitor paper". The separator may also be formed by dispersing inorganic ceramic powder and a resin binder in a solvent, coating the resultant dispersion onto an electrode layer, and then drying the coating. A solid electrolyte or gel electrolyte may also be used instead of the separator. As other materials such as the can, those employed in usual capacitors are all usable.

EXAMPLES

The present invention will next be described more specifically based on examples and comparative examples. It is to be noted that all designations of "parts" or "%" in the following examples and comparative examples are on a mass basis. It is also to be noted that the present invention shall not be limited by these examples.

<Preparation of Polymer Solutions for Individual Coating Formulations>

The compositions of the respective polymer solutions for the various coating formulations employed in the examples and comparative examples are shown in Table 1. Concerning the hydroxyalkyl chitosan used for the preparation of the polymer solutions, the following abbreviations are used: HEC for hydroxyethyl chitosan, HPC for hydroxypropyl chitosan, HBC for hydroxybutyl chitosan, HBPC for hydroxybutyl hydroxypropyl chitosan, and DHPC for glycerylated chitosan. Concerning the polybasic acids used for the preparation of the polymer solutions, the following abbreviations are used: PTC for 1,2,3-propanetricarboxylic acid, and BTC for 1,2,3,4-butanetetracarboxylic acid. As to the organic solvents used in the polymer solutions, on the other hand, the following abbreviations are used: MeOH for methyl alcohol, EtOH for ethyl alcohol, IPA for isopropyl alcohol, and NMP for N-methyl-2-pyrrolidone.

<Sample 1-1>

DHPC [hydroxyalkylation degree (HA modification degree): 0.6, weight average molecular weight (MW): 50,000] (5 parts) was dispersed in deionized water (90 parts). Subsequent to the addition of BTC (5 parts) to the dispersion, the resulting mixture was stirred at room temperature for 4 hours to achieve dissolution, so that a water-based polymer solution (100 parts) was prepared for a coating formulation.

<Samples 1-2 to 1-10>

Individual water-based polymer solutions were prepared for coating formulations according to the present invention in a similar manner as in Sample 1-1 except that the kind, HA modification degree, MW and content (mass) of the hydroxyalkyl chitosan, the kind and content of the polybasic acid and the kind and content of the water-based dispersion medium were varied as shown in Table 1.

<Sample 1-11>

For the sake of comparison, chitosan (HA modification degree: 0.0, MW: 100,000) (5 parts) was dispersed in deionized water (87 parts). Subsequent to the addition of citric acid (8 parts) to the dispersion, the resulting mixture was stirred at room temperature for 4 hours to achieve dissolution, so that a polymer solution (100 parts) was prepared for a coating formulation.

TABLE 1

Polymer Solutions for Coating Formulations

| | Hydroxyalkyl chitosan | | | | Polybasic acid | | Water-based dispersion medium | |
|---|---|---|---|---|---|---|---|---|
| Sample | Kind | HA modf. deg. | MW | Mass | Kind | Mass | Kind | Mass |
| 1-1 | DHPC | 0.6 | 50,000 | 5 | BTC | 5 | Water | 90 |
| 1-2 | DHPC | 1.1 | 80,000 | 10 | BTC | 10 | Water | 80 |
| 1-3 | DHPC | 2.3 | 160,000 | 5 | PTC | 5 | Water/IPA (7/3) | 90 |
| 1-4 | DHPC | 3.7 | 230,000 | 3 | Pyromellitic acid | 5 | Water/NMP (3/7) | 92 |

TABLE 1-continued

Polymer Solutions for Coating Formulations

| | Hydroxyalkyl chitosan | | | | Polybasic acid | | Water-based dispersion medium | |
|---|---|---|---|---|---|---|---|---|
| | HA | | | | | | | |
| Sample | Kind | modf. deg. | MW | Mass | Kind | Mass | Kind | Mass |
| 1-5 | DHPC | 1.5 | 12,000 | 10 | Citric acid | 5 | Water | 85 |
| 1-6 | DHPC | 0.9 | 5,000 | 10 | BTC | 5 | Water | 85 |
| 1-7 | HEC | 1.0 | 70,000 | 5 | BTC | 10 | Water/MeOH (5/5) | 85 |
| 1-8 | HPC | 1.2 | 60,000 | 10 | BTC | 10 | Water/EtOH (8/2) | 80 |
| 1-9 | HBC | 1.5 | 90,000 | 5 | Pyromellitic acid | 5 | Water/IPA (6/4) | 90 |
| 1-10 | HBPC | 1.1 | 130,000 | 5 | Pyromellitic acid | 5 | Water/IPA (9/1) | 90 |
| 1-11 | Chitosan | | 100,000 | 5 | Citric acid | 8 | Water | 87 |

<Preparation of Carbon Filler-Dispersed Coating Formulations and Evaluation of Dispersion Properties and Storage Stability>

Example 1

A carbon filler-dispersed coating formulation employed in this example was prepared in a manner to be described hereinafter. Furnace black ("TOKA BLACK #4500", product of Tokai Carbon Co., Ltd.) as a carbon filler and the polymer solution of Sample 1-3 for a coating formulation as shown in Table 1 were stirred and mixed at a mixing ratio of 10 parts to 90 parts at a rotational speed of 60 rpm for 120 minutes in a planetary mixer to obtain a carbon filler-dispersed coating formulation.

The resultant carbon filler-dispersed coating formulation was applied and spread on a glass plate by a bar coater No. 6. The appearance of the resulting coating film was visually examined to evaluate the dispersibility of the carbon filler. Dispersibility was evaluated as "good" when a coating film was uniform and neither of seeding, streaks and irregularities were observed, while dispersibility was evaluated as "bad" when seeding, streaks and/or irregularities were observed in a coating film.

Also to confirm the storage stability of the carbon filler-dispersed coating formulation obtained as described above, the carbon filler-dispersed coating formulation was placed in a 500-mL glass vessel, and was stored by allowing it to stand for one month at room temperature. The conditions of the carbon filler-dispersed coating formulation after the storage were visually observed to evaluate it. A carbon filler-dispersed coating formulation was evaluated as "A" when neither the formation of a supernatant or the precipitation of a filler were observed. A carbon filler-dispersed coating formulation was evaluated as "B" when the formation of a supernatant and the precipitation of the filler were observed but the filler was redispersed when the vessel was lightly shaken. A carbon filler-dispersed coating formulation was evaluated as "C" when the formation of a supernatant and the precipitation of the filler were observed, the filler was not redispersed when agitated to such an extent as the vessel was lightly shaken, and redispersion by a disperser was needed.

Examples 2 to 10, Comparative Examples 1 to 2

Carbon filler-dispersed coating formulations were prepared in a similar manner as in Example 1 except that the polymer solutions for the respective coating formulations as described in Table 2 were used in place of the polymer solution for the coating formulation as Sample 1-3 of Example 1. The dispersibility and storage stability of each of the resulting coating formulations were then determined and evaluated. The results are shown in Table 2. It is to be noted that in Comparative Example 2, a 5% solution of polyvinylidene fluoride in NMP (PVDF solution) was used as a polymer solution.

TABLE 2

Compositions and Evaluation of Carbon Filler-Dispersed Coating Formulations

| Ex./Comp. Ex. | Polymer solution for coating formulation | Kind and content of filler per 100 parts of carbon filler-dispersed coating formulation | | Dispersibility | Storage stability |
|---|---|---|---|---|---|
| | | Kind | Parts | | |
| Ex. 1 | Sample 1-3 | FB | 10 | Good | B |
| Ex. 2 | Sample 1-1 | AB | 20 | Good | A |
| Ex. 3 | Sample 1-2 | AB | 15 | Good | A |
| Ex. 4 | Sample 1-4 | AB | 10 | Good | B |
| Ex. 5 | Sample 1-5 | KB | 5 | Good | A |
| Ex. 6 | Sample 1-6 | CNT | 5 | Good | A |
| Ex. 7 | Sample 1-7 | FB | 8 | Good | B |
| Ex. 8 | Sample 1-8 | AB | 10 | Good | A |
| Ex. 9 | Sample 1-9 | AB | 5 | Good | B |
| Ex. 10 | Sample 1-10 | AB | 10 | Good | A |
| Comp. Ex. 1 | Sample 1-11 | FB | 5 | Bad | C |
| Comp. Ex. 2 | PVDF solution | AB | 5 | Good | A |

FB: Furnace black ("TOKA BLACK #4500", product of Tokai Carbon Co., Ltd.)
AB: Acetylene black ("DENKA BLACK HS-100", product of Denki Kagaku Kogyo Kabushiki Kaisha)
KB: Ketjenblack ("ECP600JD", product of Lion Corporation)
CNT: Carbon nanotubes (multilayer type, diameter: 40 to 60 nm, length: 1 to 2 μm product of Tokyo Chemical Industry Co., Ltd.)

[Application to Cells]

Example 11

Positive Electrode Plate, Negative Electrode Plate, Cell (Positive Electrode Plate)

Using carbon filler-dispersed formulation of Example 1 and employing, as a substrate, a collector formed of a 20 μm thick aluminum foil, the coating formulation was applied onto one side of the substrate by a comma roll coater. The thus-coated substrate was then dried for 2 minutes in an oven controlled at 110° C., and was further dried for 2 minutes in the oven controlled at 180° C. to eliminate the solvent and to have the polymer component crosslinked, so that a coating film was formed with a dry thickness of 1 μm on the collector.

Next, a positive electrode formulation with a positive-electrode active material contained therein was prepared in a manner to be described hereinafter. As materials for the positive electrode formulation, $LiCoO_2$ powder having particle sizes of from 1 to 100 µm, acetylene black as a conductive aid and the 5% solution of polyvinylidene fluoride as a binder in NMP (the PVDF solution) were used at a mixing ratio of 90 parts, 5 parts and 50 parts. Those materials were stirred and mixed at a rotational speed of 60 rpm for 120 minutes in a planetary mixer to obtain a slurry-form, positive electrode formulation with the positive-electrode active material contained therein.

Using the positive electrode formulation obtained as described above, the positive electrode formulation was applied by a comma roll coater onto the surface of the coating film layer formed beforehand on the positive electrode collector. The thus-coated positive electrode collector was then dried for 2 minutes in an oven controlled at 110° C., and was further dried for 2 minutes in the oven controlled at 180° C. to eliminate the solvent, so that a positive-electrode composite layer with an active material layer formed with a dry thickness of 100 µm on the coating film layer was obtained. The positive-electrode composite layer obtained in the above-described manner was pressed under a condition of 5,000 kgf/cm² to make the layer uniform. Subsequently, aging was conducted for 48 hours in a vacuum oven controlled at 80° C. to fully eliminate volatiles (the water, solvent, etc.) so that a positive electrode plate was obtained.

(Negative Electrode Plate)

Using the carbon filler-dispersed coating formulation of Example 1 and employing, as a substrate, a copper-foil collector, the carbon filler-dispersed coating formulation was applied onto one side of the substrate by a comma roll coater. The thus-coated substrate was then dried for 2 minutes in an oven controlled at 110° C., and was further dried for 2 minutes in the oven controlled at 180° C. to eliminate the solvent and to have the polymer component crosslinked, so that a coating film was formed with a dry thickness of 1 µm on the collector.

Next, a negative electrode formulation with a negative-electrode active material contained therein was prepared in a manner to be described hereinafter. As materials for the negative electrode formulation, carbon powder obtained by thermally decomposing coal coke at 1,200° C., acetylene black as a conductive aid and the 5% solution of polyvinylidene fluoride as a binder in NMP (the PVDF solution) were used at a mixing ratio of 90 parts, 5 parts and 50 parts. Those materials were stirred and mixed at a rotational speed of 60 rpm for 120 minutes in a planetary mixer to obtain a slurry-form, negative electrode formulation with the negative-electrode active material contained therein.

Using the negative electrode formulation obtained as described above, the negative electrode formulation was applied by a comma roll coater onto the surface of the coating film layer formed beforehand. The thus-coated negative electrode collector was then dried for 2 minutes in an oven controlled at 110° C., and was further dried for 2 minutes in the oven controlled at 180° C. to eliminate the solvent, so that a negative-electrode composite layer with an active material layer formed with a dry thickness of 100 µm on the coating film layer was obtained. The negative-electrode composite layer obtained in the above-described manner was pressed under a condition of 5,000 kgf/cm² to make the layer uniform. Subsequently, aging was conducted for 48 hours in a vacuum oven controlled at 80° C. to fully eliminate volatiles (the water, solvent, etc.) so that a negative electrode plate was obtained.

(Cell)

An electrode unit was first formed by using the positive electrode plate and negative electrode plate, which had been obtained as described above, and rolling them into a volute form with a separator interposed therebetween. The separator was made of a porous polyolefin (polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a cell of the AA size and 500 mAh rated capacity was assembled. Charged as an electrolyte into the cell was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of cell characteristics, charge-discharge characteristics were measured under a temperature condition of 25° C. by a charge-discharge measuring instrument as will be described below. Twenty (20) cells were respectively charged at a current value of 0.2 CA charging current, firstly in a charging direction until the cell voltage reached 4.1 V. After a break of 10 minutes, the cells were discharged at the same current until the cell voltage dropped to 2.75 V. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle (hereinafter abbreviated as "charge-discharge capacity retention") was 97%.

Examples 12 to 16, Comparative Example 3

Positive Electrode Plates, Negative Electrode Plates, Cells

In a similar manner as in Example 11 except that the carbon filler-dispersed coating formulations described in Table 3 were used in place of the carbon filler-dispersed formulation of Example 1 employed for the production of the positive electrode plate and negative electrode plate used in Example 11, electrode plates were produced and cells were manufactured. The respective cells so manufactured were measured for charge-discharge characteristics in a similar manner as in Example 11. The results are shown in Table 3.

TABLE 3

Positive Electrode Plates, Negative Electrode Plates, and Cells

| | Carbon filler-dispersed coating formulation employed for the production of positive electrode plate | Carbon filler-dispersed coating formulation employed for the production of negative electrode plate | Charge-discharge capacity retention |
|---|---|---|---|
| Ex. 11 | Coating formulation of Ex. 1 | Coating formulation of Ex. 1 | 97% |
| Ex. 12 | Coating formulation of Ex. 2 | Coating formulation of Ex. 2 | 99% |
| Ex. 13 | Coating formulation of Ex. 4 | Coating formulation of Ex. 4 | 98% |
| Ex. 14 | Coating formulation of Ex. 5 | Coating formulation of Ex. 5 | 97% |
| Ex. 15 | Coating formulation of Ex. 6 | Coating formulation of Ex. 6 | 96% |
| Ex. 16 | Coating formulation of Ex. 9 | Coating formulation of Ex. 9 | 93% |

TABLE 3-continued

Positive Electrode Plates, Negative Electrode Plates, and Cells

|  | Carbon filler-dispersed coating formulation employed for the production of positive electrode plate | Carbon filler-dispersed coating formulation employed for the production of negative electrode plate | Charge-discharge capacity retention |
|---|---|---|---|
| Comp. Ex. 3 | Coating formulation of Comp. Ex. 2 | Coating formulation of Comp. Ex. 2 | 81% |

[Application to Capacitors]

Example 17

Capacitor

Using the carbon filler-dispersed coating formulation of Example 1 and employing, as a substrate, a collector formed of a 20-μm thick aluminum foil, the coating formulation was applied onto one side of the substrate by a comma roll coater. After the coating, the coated substrate was dried for 2 minutes in an oven controlled at 110° C. The coated substrate was further dried for 2 minutes in the oven controlled at 180° C. to eliminate the solvent and to have the resin binder crosslinked, so that a coating film layer was formed with a dry thickness of 0.5 μm on the collector.

An electrode formulation with an active material contained therein was next prepared in a manner to be described hereinafter. As materials for the electrode formulation, high-purity activated carbon powder (specific surface area: 1,500 m$^2$/g, average particle size: 10 μm; 100 parts) and acetylene black (8 parts) as a conductive material were used. Those materials were charged in a planetary mixer, and the solution of polyvinylidene fluoride in NMP was added to give a total solids concentration of 45%, followed by mixing for 60 minutes. Subsequently, the mixture was diluted with NMP to a solids concentration of 42%, followed by further mixing for 10 minutes to obtain an electrode formulation. Using a doctor blade, the electrode formulation was applied onto the coating film layer formed beforehand, followed by drying at 80° C. for 30 minutes in a fan dryer. Using a roll press, pressing was then conducted to obtain a polarizable, capacitor electrode plate having a thickness of 80 μm and a density of 0.6 g/cm$^3$.

From the polarizable, capacitor electrode plate produced as described above; two discs were cut out with a diameter of 15 mm. Those discs were dried at 200° C. for 20 hours. Those two electrode discs were arranged with their electrode layer sides opposing each other, and a cellulose-made, disc-shaped separator of 18 mm in diameter and 40 μm in thickness was held between the electrode discs. The thus-obtained electrode unit was placed in a coin-shaped case made of stainless steel (diameter: 20 mm, height: 1.8 mm, stainless steel thickness: 0.25 mm) and equipped with a polypropylene-made packing. An electrolyte was charged into the case such that no air was allowed to remain. A 0.2-mm thick stainless steel cap was put and fixed on the case with the polypropylene-made packing interposed therebetween. The case was then sealed to produce a coin-shaped capacitor of 20 mm in diameter and about 2 mm in thickness. As the electrolyte, a solution with tetraethylammonium tetra fluoroborate dissolved at a concentration of 1 mole/L in propylene carbonate was employed. The capacitor obtained as described above was measured for capacitance and internal resistance. The results are shown in Table 4.

Examples 18 to 21

Capacitors

In a similar manner as in Example 17 except that the carbon filler-dispersed coating formulations described in Table 4 were used in place of the carbon filler-dispersed coating formulation of Example 1 employed in Example 17, polarizable electrode plates were produced and capacitors were manufactured, and the characteristics of the respective capacitors so obtained were evaluated. The results are shown in Table 4.

Comparative Example 4

In a similar manner as in Example 17 except that the carbon filler-dispersed coating formulation of Comparative Example 2 was used in place of the carbon filler-dispersed coating formulation of Example 1 employed in Example 17, electrode plates were produced and a capacitor was manufactured. Further, the internal resistance and capacitance of the capacitor were measured, and were used as references for evaluating the polarizable electrode plates and capacitors of the examples.

Concerning the internal resistances and capacitances in Table 4, they were measured as will be described next, and were evaluated in accordance with the below-described standards. With respect to each capacitor, its capacitance and internal resistance were measured at a current density of 20 mA/cm$^2$, and based on the capacitor of Comparative Example 4 as a reference, the performance of the capacitor of each example was evaluated in accordance with the following standards. The greater the capacitance and the lower the internal resistance, the better the performance as a capacitor.

(Evaluation Standards for Capacitance)
  A: Capacitance greater by 20% or more than Comparative Example 4.
  B: Capacitance greater by 10% or more but less than 20% than Comparative Example 4.
  C: Capacitance equal to or smaller than Comparative Example 4.

(Evaluation Standards for Internal Resistance)
  A: Internal resistance lower by 20% or more than Comparative Example 4.
  B: Internal resistance lower by 10% or more but less than 20% than Comparative Example 4.
  C: Internal resistance equal to or higher than Comparative Example 4.

TABLE 4

Evaluation of Characteristics of Electrode Plates and Capacitors

|  | Carbon filler-dispersed coating formulation employed for the production of polarizable electrode plate | Capacitance | Internal resistance |
|---|---|---|---|
| Ex. 17 | Coating formulation of Ex. 1 | B | B |
| Ex. 18 | Coating formulation of Ex. 3 | B | B |
| Ex. 19 | Coating formulation of Ex. 5 | B | B |
| Ex. 20 | Coating formulation of Ex. 8 | B | A |
| Ex. 21 | Coating formulation of Ex. 10 | B | A |
| Comp. Ex. 4 | Coating formulation of Comp. Ex. 2 | — | — |

As evident from the above examples and comparative example, it has been confirmed that a capacitor of large capacitance and low internal resistance can be obtained when electrode plates provided with coating films formed from the carbon filler-dispersed coating formulation according to the present invention are produced, and the capacitor is manufactured using the electrode plates.

<Preparation of Polymer Solutions for Individual Coating Formulations>

The compositions of the individual polymer solutions to be employed for coating formulations in examples and comparative examples are shown in Table 5. The abbreviations of the components, which are shown in Table 5 and are other than those to be described below, are the same as in Table 1. "CHHC" employed as a polybasic acid in the polymer solutions is an abbreviation of 1,2,3,4,5,6-cyclohexanehexacarboxylic acid. "DMSO" employed as a poplar solvent in the polymer solutions is an abbreviation of dimethyl sulfoxide.

<Sample 2-1>

DHPC (hydroxyalkylation degree (HA modification degree): 1.1, weight average molecular weight (MW): 90,000; 10 parts) was dispersed in water (80 parts). Subsequent to the addition of BTC (10 parts) to the dispersion, the resulting mixture was stirred at 50° C. for 2 hours to achieve dissolution, so that a solution of dihydroxypropyl chitosan (100 parts) was prepared.

<Samples 2-2 to 2-6>

Polymer solutions for coating formulations according to the present invention were prepared in a similar manner as in Sample 2-1 except that the kind and content (mass) of the polymer, the kind and content of the polybasic acid and the kind and content of the polar solvent were varied as shown in Table 5.

in the oven controlled at 180° C. to eliminate the solvent and to have the polymer component crosslinked, so that a coating film was formed with a dry thickness of 1 µm on the collector.

Parallel lines, which consisted of perpendicularly-intersecting 11 vertical lines and 11 horizontal lines, were drawn by a cutter at intervals of 1 mm on the coating film layer obtained as described above so that 100 squares were formed within 1 cm$^2$. A mending tape was applied to the surface of the coating film layer, and tape peeling was then conducted. The number of squares which were not peeled off was determined as a measure of adhesiveness to the collector. The average of 10 tests was 99.0 squares. The coating film layer with the squares formed thereon as described above was immersed at 70° C. for 72 hours in a solution prepared by dissolving LiPF$_6$ (1 mole) as a supporting salt in a mixed solvent of EC (ethylene carbonate), PC (propylene carbonate) and DME (dimethoxyethane) combined together at a volume ratio of 1:1:2. Further, the conditions of the coating film layer after the immersion were visually observed. One developed no changes is indicated as "none" under "solubility/swellability", while one with its coating film layer having been peeled or swollen is indicated as "equipped" under "solubility/swellability".

Also to evaluate the electrical conductivity of the coating film layer obtained as described above, the coating formulation was applied onto a glass plate by a comma roll coater, and the thus-coated glass plate was then dried for 1 minute in an oven controlled at 200° C. to form a conductive coating film (dry thickness: 4 µm).

The surface resistivity of the resultant coating film was determined by the four-point probe method in accordance with JIS K 7194. The measurement was conducted under the conditions of 25° C. and 60% relative humidity by using the

TABLE 5

Polymer Solutions for Coating Formulations

| Sample | Hydroxyalkyl chitosan | | | | Polybasic acid | | Polar solvent | |
|---|---|---|---|---|---|---|---|---|
| | Kind | HA modification degree | MW | parts | Kind | parts | Kind | parts |
| 2-1 | DHPC | 1.1 | 90,000 | 10 | BTC | 10 | Water | 80 |
| 2-2 | DHPC | 1.1 | 90,000 | 5 | BTC | 5 | Water/IPA = 90/10 | 90 |
| 2-3 | DHPC | 1.1 | 90,000 | 5 | Pyromellitic acid | 5 | Water | 90 |
| 2-4 | DHPC | 1.6 | 120,000 | 5 | Pyromellitic acid | 3 | Water/EtOH = 50/50 | 92 |
| 2-5 | HEC | 1.2 | 80,000 | 5 | CHHC | 2 | DMSO | 93 |
| 2-6 | DHPC | 1.6 | 120,000 | 5 | Pyromellitic acid | 5 | NMP | 90 |

<Preparation of Carbon Filler-Dispersed Coating Formulations and Coating Films and Evaluation of Coating Films>

Example 22

A carbon filler-dispersed coating formulation of this example was prepared in a manner to be described hereinafter. Acetylene black (AB) as a carbon filler and the polymer solution of Sample 2-1 in Table 5 were stirred and mixed at a mixing ratio of 7 parts to 93 parts at a rotational speed of 60 rpm for 120 minutes in a planetary mixer to obtain a slurry-form coating formulation.

Using the coating formulation obtained as described above and employing, as a substrate, a collector formed of a 20-µm thick aluminum foil, the coating formulation was applied onto one side of the substrate by a comma roll coater. After the coating, the coated substrate was dried for 2 minutes in an oven controlled at 110° C., and was further dried for 2 minutes "LORESTA-GP MCP-T610" (manufactured by Mitsubishi Chemical Analytech Co., Ltd.).

Examples 23 to 25, Comparative Examples 5 to 7, and Referential Examples 1 and 2

Coating films were prepared in a similar manner as in Example 22 except that the polymer solutions described in Table 6 were used respectively in place of the polymer solution of Sample 2-1 in Example 22. The adhesiveness, solubility/swellability and surface resistivity of each resulting coating film were then determined in a similar manner as in Example 22, and the results described in Table 6 were obtained. It is to be noted that the 5% solution of polyvinylidene fluoride in NMP (the PVDF solution) was used in Comparative Example 5 and the styrene-butadiene copolymer latex (with the use of sodium carboxymethylcellulose as a thickener) was used in Comparative Example 6.

TABLE 6

Compositions of Carbon Filler-Dispersed Coating Formulations and Characteristics of Coating Films

| Ref. Ex./ Examples/ Comp. Ex. | Polymer solution for coating formulation | Per 100 parts of coating formulation | | | Adhesiveness (av. value) | Solubility/ Swellability | Surface resistivity ($\Omega/\square$) |
|---|---|---|---|---|---|---|---|
| | | Content of resin Parts (solids) | Kind and content of filler | | | | |
| | | | Kind | Content | | | |
| Ex. 22 | Sample 2-1 | 9.3 | AB | 7 | 99 | None | 1790 |
| Ex. 23 | Sample 2-2 | 4.6 | AB | 8 | 100 | None | 620 |
| Ex. 24 | Sample 2-3 | 4.7 | AB | 7 | 100 | None | 850 |
| Ex. 25 | Sample 2-4 | 4.8 | AB | 5 | 99 | None | 1210 |
| Ref. Ex. 1 | Sample 2-5 | 4.8 | AB | 5 | 97 | None | 920 |
| Ref. Ex. 2 | Sample 2-6 | 4.7 | AB | 7 | 100 | None | 770 |
| Comp. Ex. 5 | PVDF solution | 4.8 | AB | 5 | 37 | Equipped | 1800 |
| Comp. Ex. 6 | SBR + CMC dispersion | 3.0 | AB | 5 | 95 | Equipped | 1060 |

SBR: Styrene-butadiene copolymer latex ("NALSTAR SR-112", product of Nippon A & L Inc.)
CMC: Sodium carboxymethylcellulose ("SUNROSE F-600LC", product of Nippon Paper Chemicals Co., Ltd.)

<Application to Cells>

Example 26

Positive Electrode Plate, Negative Electrode Plate, Cell (Positive Electrode Plate)

A positive electrode formulation with a positive-electrode active material contained therein was prepared in a manner to be described hereinafter. As materials for the positive electrode formulation, $LiCoO_2$ powder having particle sizes of from 1 to 100 μm, acetylene black as a conductive aid and the 5% solution of polyvinylidene fluoride as a binder in NMP (the PVDF solution) were used at a mixing ratio of 90 parts, 5 parts and 50 parts. They were then stirred and mixed at a rotational speed of 60 rpm for 120 minutes in a planetary mixer to obtain a slurry-form, positive electrode formulation with the positive-electrode active material contained therein.

Using the positive electrode formulation obtained as described above, the positive electrode formulation was applied by a comma roll coater onto the surface of the coating film layer formed beforehand in Example 22. The thus-coated positive electrode collector was then dried for 2 minutes in an oven controlled at 110° C., and was further dried for 2 minutes in the oven controlled at 180° C. to eliminate the solvent, so that a positive-electrode composite layer with an active material layer formed with a dry thickness of 100 μm on the coating film layer was obtained. The positive-electrode composite layer obtained in the above-described manner was pressed under the condition of 5,000 kgf/cm² to make the layer uniform. Subsequently, aging was conducted for 48 hours in a vacuum oven controlled at 80° C. to fully eliminate volatiles (the solvent, unreacted polybasic acid, etc.) so that a positive electrode plate was obtained.

(Negative Electrode Plate)

Using the coating formulation of Example 22 and employing, as a substrate, a copper-foil collector, the coating formulation was applied onto one side of the substrate by a comma roll coater. The thus-coated substrate was then dried for 2 minutes in an oven controlled at 110° C., and was further dried for 2 minutes in the oven control led at 180° C. to eliminate the solvent and to have the resin binder crosslinked, so that a coating film layer was formed with a dry thickness of 1 μm on the collector.

Next, a negative electrode formulation with a negative-electrode active material contained therein was prepared in a manner to be described hereinafter. As materials for the negative electrode formulation, carbon powder obtained by thermally decomposing coal coke at 1,200° C., acetylene black as a conductive aid and the 5% solution of polyvinylidene fluoride as a binder in NMP (the PVDF solution) were used at a mixing ratio of 90 parts, 5 parts and 50 parts. They were stirred and mixed at a rotational speed of 60 rpm for 120 minutes in a planetary mixer to obtain a slurry-form, negative electrode formulation with the negative-electrode active material contained therein.

Using the negative electrode formulation obtained as described above, the negative electrode formulation was applied by a comma roll coater onto the surface of the coating film layer formed beforehand. The thus-coated negative electrode collector was then dried for 2 minutes in an oven controlled at 110° C., and was further dried for 2 minutes in the oven controlled at 180° C. to eliminate the solvent, so that a negative-electrode composite layer with an active material layer formed with a dry thickness of 100 μm on the coating film layer was obtained. The negative-electrode composite layer obtained in the above-described manner was pressed under the condition of 5,000 kgf/cm² to make the layer uniform. Subsequently, aging was conducted for 48 hours in a vacuum oven controlled at 80° C. to fully/eliminate volatiles (the solvent, unreacted polybasic acid, etc.) so that a negative electrode plate was obtained.

(Cell)

An electrode unit was first formed by using the positive electrode plate and negative electrode plate, which had been obtained above, and rolling them into a volute form with a separator interposed therebetween. The separator was made of a porous polyolefin (polypropylene, polyethylene or a copolymer thereof) film having a width broader than the positive electrode plate and a three-dimensional porous (spongy) structure. Using that electrode unit, a cell was manufactured in a similar manner as in Example 11.

For the measurement of cell characteristics, charge-discharge characteristics were measured by a charge-discharge measuring instrument under similar conditions as in Example 11. As a result, when the charge-discharge capacity in the cycle was assumed to be 100, the charge-discharge capacity in the $100^{th}$ cycle (charge-discharge capacity retention) was 97%.

Examples 27 and 28, Comparative Example 7, Referential Example 3

(Positive Electrode Plates, Negative Electrode Plates, Cells)

In a similar manner as in Example 26 except that the coating formulations and coating films shown below in Table 7 were used in place of the coating formulation and coating film of Example 22 employed for the production of the positive electrode plate and negative electrode plate used in Referential Example 26, electrode plates were produced and cells were manufactured, and the cells were measured for charge-discharge characteristics. The results are shown in Table 7.

TABLE 7

Positive Electrode Plates, Negative Electrode Plates, and Cells

|  | Coating film employed for the production of positive electrode plate | Coating formulation employed for the production of negative electrode plate | Charge-discharge capacity retention |
|---|---|---|---|
| Ex. 26 | Coating film of Ex. 22 | Coating formulation of Ex. 22 | 97% |
| Ex. 27 | Coating film of Ex. 23 | Coating formulation of Ex. 23 | 99% |
| Ex. 28 | Coating film of Ex. 24 | Coating formulation of Ex. 24 | 99% |
| Ref. Ex. 3 | Coating film of Ref. Ex. 2 | Coating formulation of Ref. Ex. 2 | 98% |
| Comp. Ex. 7 | Coating film of Comp. Ex. 5 | Coating formulation of Comp. Ex. 5 | 83% |

[Application to Capacitors]

Example 29

Capacitor

Using the coating formulation of Example 23 and employing, as a substrate, a collector formed of a 20-μm thick aluminum foil, the coating formulation was applied onto one side of the substrate by a comma roll coater. After the coating, the coated substrate was dried for 2 minutes in an oven controlled at 110° C. The coated substrate was further dried for 2 minutes in the oven controlled at 180° C. to eliminate the solvent and to have the resin binder crosslinked, so that a coating film layer was formed with a dry thickness of 0.5 μm on the collector.

An electrode formulation with an active material contained therein was next prepared in a manner to be described hereinafter. As materials for the electrode formulation, high-purity activated carbon powder (specific surface area: 1,500 m²/g, average particle size: 10 μm; 100 parts) and acetylene black (8 parts) as a carbon filler were charged in a planetary mixer, and the solution of polyvinylidene fluoride in NMP was added to give a total solids concentration of 45%, followed by mixing for 60 minutes. Subsequently, the mixture was diluted with NMP to a solids concentration of 42%, followed by further mixing for 10 minutes to obtain an electrode formulation. Using a doctor blade, the electrode formulation was applied onto the coating film layer, followed by drying at 80° C. for 30 minutes in a fan dryer. Using a roll press, pressing was then conducted to obtain a polarizable, capacitor electrode plate having a thickness of 80 μm and a density of 0.6 g/cm³.

From the polarizable capacitor electrode plate produced as described above, two discs were cut out with a diameter of 15 mm. Those discs were dried at 200° C. for 20 hours. Those two electrode discs were arranged with their electrode layer sides opposing each other, and a cellulose-made, disc-shaped separator of 18 mm in diameter and 40 μm in thickness was held between the electrode discs. The thus-obtained electrode unit was placed in a coin-shaped case made of stainless steel (diameter: 20 mm, height: 1.8 mm, stainless steel thickness: 0.25 mm) and equipped with a polypropylene-made packing. In a similar manner as in Example 17, a capacitor having the polarizable electrode plate was manufactured. The resulting capacitor was measured for capacitance and internal resistance. The results are shown in Table 8.

Example 30, Referential Example 4

Capacitors

In a similar manner as in Example 29 except that the coating formulations described in Table 8 were used in place of the coating formulation of Example 23 employed in Example 29, polarizable electrode plates were produced and capacitors were manufactured, and the characteristics of the respective capacitors were evaluated. The results are shown in Table 8.

Comparative Example 8

In a similar manner as in Example 29 except that the coating formulation of Comparative Example 5 was used in place of the coating formulation of Example 23 employed in Example 29, polarizable electrode plates were produced and a capacitor was manufactured. The characteristics of the capacitor were evaluated. The results are shown in Table 8.

Concerning the internal resistances and capacitances in Table 8, they were measured as will be described next and were evaluated in accordance with the below-described standards. With respect to each capacitor, its capacitance and internal resistance were measured at a current density of 20 mA/cm². Based on the capacitor of Comparative Example 8 as a reference, the performance of the capacitor of each example was evaluated in accordance with the following standards. The greater the capacitance and the lower the internal resistance, the better the performance as a capacitor.

(Evaluation Standards for Capacitance)

A: Capacitance greater by 20% or more than Comparative Example 8.

B: Capacitance greater by 10% or more but less than 20% than Comparative Example 8.

C: Capacitance equal to or smaller than Comparative Example 8.

(Evaluation Standards for Internal Resistance)

A: Internal resistance lower by 20% or more than Comparative Example 8.

B: Internal resistance lower by 10% or more but less than 20% than Comparative Example 8.

C: Internal resistance equal to or higher than Comparative Example 8.

TABLE 8

Evaluation of Characteristics of Electrode Plates and Capacitors

| Ex./Comp. Ex. | Coating formulation employed for the production of polarizable electrode plate | Capacitance | Internal resistance |
|---|---|---|---|
| Ex. 29 | Coating formulation of Ex. 23 | A | A |
| Ex. 30 | Coating formulation of Ex. 24 | A | A |
| Ref. Ex. 4 | Coating formulation of Ref. Ex. 2 | A | A |
| Comp. Ex. 8 | Coating formulation of Comp. Ex. 5 | — | — |

As evident from the above examples and comparative example, a capacitor of large capacitance and low internal resistance can be obtained when electrode plates according to the present invention, each of which includes a coating film, are produced and the capacitor is manufactured using the electrode plates.

INDUSTRIAL APPLICABILITY

As has been described above, the present invention can provide a coating formulation of excellent properties that a carbon filler is reduced in settling-out and high dispersion properties and dispersion stability are both equipped, because a hydroxyalkyl chitosan such as glycerylated chitosan has an excellent dispersing function for the carbon filler and a function as a resin binder in combination although it is a natural polymer of biological origin that does not add much load on the environment. According to the present invention, the use of the coating formulation enables to provide a conductive coating film which contains the carbon filler uniformly dispersed therein and is excellent in adhesiveness and also in solvent resistance. According to the present invention, an electrode plate for an electricity storage device and the electricity storage device including the electrode plate are provided. The electrode plate is equipped with excellent adhesiveness to an interface between an electrode layer and a collector formed of an aluminum foil, copper foil or the like and superb electrolyte resistance especially owing to the use of the carbon filler-dispersed coating formulation for the electrode of the electricity storage device and the arrangement of a coating film, which has been formed from the coating formulation, between the collector and the electrode layer. When applied to various substrates such as metals, resins, ceramics and collectors for electricity storage devices, the above-described carbon filler-dispersed coating formulation provides conductivity-imparting materials of excellent performance that the conductivity which the carbon filler has is effectively exhibited, and therefore, the carbon filler-dispersed coating formulation is expected to find utility in many fields. Accordingly, the present invention can become useful in that they contribute to the protection of environment and the prevention of health hazards, both of which have become objects of international public concern in recent years.

The invention claimed is:

1. A water-based, carbon filler-dispersed coating formulation for forming a conductive coating film, comprising:
(1) a hydroxyalkyl chitosan as a resin binder;
(2) a conductive carbon filler; and
(3) a polybasic acid or a derivative thereof,
in a water-based medium, which is water or a mixed dispersion medium that is a mixture of water and an organic solvent miscible with water, the organic solvent being at least one solvent selected from the group consisting of alcohols, esters, ketones, amides, sulfoxides, and mixtures thereof,
wherein in 100 parts by mass of the coating formulation, the hydroxyalkyl chitosan (1) is contained in an amount from 0.1 to 20 parts by mass, and the conductive carbon filler (2) is contained in an amount from 1 to 30 parts by mass,
the coating formulation contains the water-based medium at least 68% by mass, and
an amount ratio of the organic solvent relative to the water in the water-based medium by mass is in a range from 0/100 to 70/30, and
the hydroxyalkyl chitosan has a weight average molecular weight in a range from 2,000 to 350,000.

2. The water-based, carbon filler-dispersed coating formulation according to claim 1,
wherein the hydroxyalkyl chitosan comprises at least one hydroxyalkyl chitosan selected from the group consisting of glycerylated chitosan, hydroxyethyl chitosan, hydroxypropyl chitosan, hydroxybutyl chitosan, and hydroxybutyl hydroxypropyl chitosan.

3. The water-based, carbon filler-dispersed coating formulation according to claim 1, wherein the hydroxyalkyl chitosan has a hydroxyalkylation degree of 0.5 or higher but 4 or lower.

4. The water-based, carbon filler-dispersed coating formulation according to claim 1, wherein the polybasic acid or the derivative thereof is contained in an amount from 20 to 300 parts by mass per 100 parts by mass of the hydroxyalkyl chitosan.

5. The water-based, carbon filler-dispersed coating formulation according to claim 1,
wherein the conductive carbon filler is at least one conductive carbon filler selected from the group consisting of carbon black, acetylene black, Ketjenblack, furnace black, natural graphite, artificial graphite, carbon nanofibers and carbon nanotubes.

6. The water-based, carbon filler-dispersed coating formulation according to claim 1,
wherein the polybasic acid is at least one polybasic acid selected from the group consisting of 1,2,3,4-butanetetracarboxylic acid, pyromellitic acid, citric acid, 1,2,3-propanetricarboxylic acid, 1,2,4-cyclohexanetricarboxylic acid, 1,2,4,5-cyclohexanetetracarboxylic acid, trimellitic acid, 1,4,5,8-naphthalenetetracarboxylic acid, and 1,2,3,4,5,6-cyclohexanehexacarboxylic acid.

7. The water-based, carbon filler-dispersed coating formulation according to claim 1, further comprising at least one resin component, which is selected from the group consisting of polyvinyl alcohol, polyvinyl acetal, polyacrylic acid, fluorine-containing macromolecules, cellulose-based macromolecules, starch-based macromolecules, styrene-based polymers, acrylic polymers, styrene-acrylate ester copolymers, polyamides, polyimides, and polyamide-imides, as a binder in an amount from 10 to 2,000 parts by mass per 100 parts by mass of the hydroxyalkyl chitosan.

8. The water-based, carbon filler-dispersed coating formulation according to claim 1,
wherein the alcohols in the group are methyl alcohol, ethyl alcohol, n-propyl alcohol, isopropyl alcohol, n-butyl alcohol, s-butyl alcohol, isobutyl alcohol, and t-butyl alcohol,
the esters in the group are methyl acetate, ethyl acetate, n-propyl acetate, isopropyl acetate, n-butyl acetate, isobutyl acetate, methoxybutyl acetate, cellosolve acetate, amyl acetate, methyl lactate, ethyl lactate, and butyl lactate, the ketones in the group are acetone, methyl ethyl ketone, methyl isobutyl ketone, diisobutyl ketone, and cyclohexanone, the amides in the group are N-methyl-2-pyrrolidone, N,N-dimethylacetamide, and N,N-dimethylformamide, and the sulfoxides in the group is dimethyl sulfoxide.

* * * * *